US011866900B2

(12) United States Patent
Rojas Ubilla

(10) Patent No.: US 11,866,900 B2
(45) Date of Patent: Jan. 9, 2024

(54) PANEL SYSTEM FOR ROCKBURST OR LANDSLIDE CONTAINMENT IN MINING TUNNELS AND ROAD WORKS CONSISTING OF A FRAME ATTACHED TO A STRAP MESH WHOSE NODES ARE LINKED BY CONNECTING BUCKLES; AND INSTALLATION PROCEDURE

(71) Applicant: GARIBALDI S.A., Santiago (CL)

(72) Inventor: José Alberto Rojas Ubilla, Santiago (CL)

(73) Assignee: Garibaldi S.A., Santiago (CL)

( * ) Notice: Subject to any disclaimer, the term of this patent is extended or adjusted under 35 U.S.C. 154(b) by 32 days.

(21) Appl. No.: 17/618,441

(22) PCT Filed: Jun. 28, 2019

(86) PCT No.: PCT/CL2019/050053
§ 371 (c)(1),
(2) Date: Dec. 11, 2021

(87) PCT Pub. No.: WO2020/248083
PCT Pub. Date: Dec. 17, 2020

(65) Prior Publication Data
US 2022/0251796 A1 Aug. 11, 2022

(30) Foreign Application Priority Data
Jun. 11, 2019 (CL) .................................. 1602-2019

(51) Int. Cl.
*E01F 7/04* (2006.01)
*E02D 17/20* (2006.01)
(Continued)

(52) U.S. Cl.
CPC .............. *E02D 17/20* (2013.01); *E01F 7/045* (2013.01); *E21D 11/006* (2013.01); *E21D 11/36* (2013.01)

(58) Field of Classification Search
CPC ........ E02D 17/20; E01F 7/045; E21D 11/006; E21D 11/36; E21D 11/152; E02B 3/122
See application file for complete search history.

(56) References Cited

U.S. PATENT DOCUMENTS 5,091,247 A * 2/1992 Willibey ................ D03D 19/00
139/50
5,190,080 A * 3/1993 Peder ...................... E01F 7/045
140/9

(Continued)

FOREIGN PATENT DOCUMENTS

| CH | 617488 | 5/1980 |
| CN | 202108529 | 11/2012 |

(Continued)

OTHER PUBLICATIONS

Garibaldi S.A.; International Preliminary Report on Patentability for PCT/CL2019/050053, filed Jun. 28, 2019, dated Apr. 30, 2020, 57 pgs.

(Continued)

*Primary Examiner* — Benjamin F Fiorello
(74) *Attorney, Agent, or Firm* — Taylor English Duma LLP

(57) ABSTRACT

A panel system for the containment of landslides caused by partial collapses and also by "rock breakdowns", for use in the fortification of mining tunnels, hillsides and roads, together with anchor bolts and plates, comprising a network constituted by straps of metal or other material resistant to traction or with the capacity of tearing along the strap (1) (2) (3), with each node of this network firmly linked with a buckle (6) (7) (8) (16) and with a frame (20) attached to this (Continued)

network, where the frame comprises flat tendons (17) near the perimeter of the panel, linked to plates with lugs (D11) or with flat connectors (12) (13) (14) (15) which go beneath the normal plates.

13 Claims, 22 Drawing Sheets

(51) Int. Cl.
  *E21D 11/00* (2006.01)
  *E21D 11/36* (2006.01)

(56) References Cited

U.S. PATENT DOCUMENTS

| | | | |
|---|---|---|---|
| 5,199,673 A | 4/1993 | Bolliger | |
| 5,364,206 A * | 11/1994 | Marienfeld | E02D 17/202 405/15 |
| 5,415,498 A * | 5/1995 | Seegmiller | E21D 11/006 405/302.2 |
| 5,957,627 A * | 9/1999 | Stankus | E21D 11/006 405/259.1 |
| 6,299,110 B1 * | 10/2001 | Ferraiolo | B21F 15/06 52/712 |
| 7,377,725 B2 * | 5/2008 | Cammack | E02D 29/0233 405/262 |
| 7,555,862 B2 * | 7/2009 | Li | E02B 3/122 47/65.7 |
| 2004/0149976 A1 * | 8/2004 | Russo | E01F 7/045 256/47 |
| 2011/0013992 A1 * | 1/2011 | Fujii | G06F 30/00 703/1 |
| 2011/0044770 A1 * | 2/2011 | Potvin | E21D 11/152 405/302.7 |
| 2011/0250024 A1 * | 10/2011 | Mirabile | E21D 11/006 405/288 |
| 2020/0355076 A1 * | 11/2020 | Steffenino | E21D 11/006 |

FOREIGN PATENT DOCUMENTS

| | | |
|---|---|---|
| CN | 105863669 | 8/2016 |
| CN | 208023595 | 10/2018 |
| JP | 3212743 U | 9/2017 |
| JP | 2018040110 | 3/2018 |
| JP | 2018188921 | 11/2018 |
| KR | 101422780 | 7/2014 |

OTHER PUBLICATIONS

Garibaldi S.A.; International Search Report and Written Opinion for PCT/CL2019/050053, filed Jun. 28, 2019, dated Oct. 16, 2019, 25 pgs.

* cited by examiner

PANEL SYSTEM FOR ROCKBURST OR LANDSLIDE CONTAINMENT IN MINING TUNNELS AND ROAD WORKS CONSISTING OF A FRAME ATTACHED TO A STRAP MESH WHOSE NODES ARE LINKED BY CONNECTING BUCKLES; AND INSTALLATION PROCEDURE

SUMMARY

This work deals with a rockfall containment panel system for subway mining tunnels and road works, which is part of the reinforcement structure system that uses anchor bolts and plates. It specifically addresses a panel system consisting of a mesh of metal straps or other tensile resistant material, whose perimeter is firmly fastened to a frame formed by flat tension wires, each of them made of two or more overlapping extra-strong straps; at each point of the perimeter where each of the anchor bolts with their plates will be located, there will also be flat plates running underneath them to connect the flat tension wires to each other, to form the frame at the perimeter of the panel system. Inside the perimeter of the panel system, the anchor bolts may also be connected to each other with flat tension wires and flat connections, but the metal straps of the mesh will run underneath the flat tension wires, without connecting to them. The strap mesh will remain below the flat tension wires towards the tunnel wall or slope; it will be formed by parallel longitudinal straps made of metal or other material and attached to a similar secondary structure, in the same plane, but at 90° and placed between the previous one and the tunnel wall. Each node of the mesh, where a strap meets another one perpendicular to it, is fastened with a buckle that preserves the original strength of the straps while retaining their elongation properties. The nodes allow this mesh to withstand the punching test that is used to define the strength of woven and electrowelded wire meshes currently used in mining.

A key part of this containment panel system is a set of flat connectors that connect the flat tension wires, which will remain under the plates inserted in the anchor bolts. The complete factory-made containment panel system will be mounted on the anchor bolts already in place in the tunnel. The panels can also be temporarily mounted with rivet nails at certain points of the straps and then drilled, the final anchor bolts can be placed to shim the flat connections, and the plates and nuts can be fitted. Alternatively, the mesh can be installed in a similar fashion and instead of the current meshes and instead of common plates, it can be fitted with plates with welded tabs. If the deposit's dynamics warrant it, flat tension wires may be added over the mesh at a later date, connecting adjacent anchor bolts to protect the area from landslides caused by the failure or displacement of an anchor bolt.

When the bolts and plates are finally installed, the entire reinforcement structure will act as a comprehensive system that allows:

a) containing the weight of the falling rocks; and
b) absorbing the kinetic energy ($\frac{1}{2}*m*v^2$) of all the mass released by the bursting of rocks or other phenomena giving them a high velocity, with a kinetic energy greater than 25 kJoule/m$^2$ and up to 75 kJoule/m$^2$. The mesh will stop the mass released at high speed by pulling the straps firmly contained by the frame until they locally reach their permanent plastic deformation, therefore absorbing the kinetic energy of the rock mass. The mesh is sized as required to maintain its integrity and, therefore, retains all spalled or flaking material from the tunnel wall or vault.

DESCRIPTION OF THE STATE OF THE ART

Currently, medium and high resistance steel wire meshes are used, woven in a spiral that intertwines with the next one forming a rhombus or diamond and also, in some reinforcement structures, electrowelded steel wire meshes are used, forming square or rectangular grids. These include utility model application CL 776-2016, wherein a wire mesh is presented for use in lining tunnel walls consisting of spirally bent wires or the like, intertwined and made of extra-strong steel, wherein the wire mesh forms a three-dimensional structure with a height perpendicular to the longitudinal plane with a clearance, wherein the wires are coated with anti-corrosion material, wherein the bending radius of the spirally bent or similar wires has a minimum size so that the outer side of the wires in the bending section is below the stretching limit to prevent cracking of the coating of anti-corrosion material.

In general, these types of mesh are attached to the tunnel wall by means of slightly tapered, cold-stamped square plates that serve as large anchor bolt washers, such as patent application CL 2190-2011, wherein a star domed steel plate is disclosed between an anchor bolt and a nut in an anchoring system, comprising a six-pointed star dome, with a 200×200 mm flat square steel plate, multiple triangular concave geometry ribs, concave ribs, and a domed central deformation. These devices trap the mesh between the plate and the tunnel rock. The woven diamond meshes are usually coated with mortar or shotcrete to prevent them from hanging separately from the tunnel walls, and also to prevent the rupture of a wire segment from slipping the rest of the wire strand, causing a transverse cut in the mesh. This forms a solid crust, with the embedded wires, creating a kind of reinforced concrete. In addition, smaller rocks that can pass through the free spaces in the mesh are retained.

There are also electrowelded meshes in main tunnels, such as the one disclosed in application WO2015072838, which shows an electrically welded mesh for rock reinforcement in mining tunnels, produced with drawn wire joined by welding, with rounded ends, where oftentimes a large amount of shotcrete is added (30 cm or more), forming the equivalent of a reinforced concrete wall.

On the other hand, in the case of landslides, parts of the electrowelded or woven mesh remain attached to the uncollapsed tunnel wall or vault by the hardened concrete and the whole of this sector is retained by the anchor bolts that are still in place with their respective plates. These meshes undergo two simultaneous phenomena: receiving the weight of the mass of detached rocks and the kinetic energy generated by the rock burst, where the mesh is punctured by the tips of some rocks, but where the greatest resistance is required at the points in which the wires rest and hang on the plates. If some of these wires were to be cut in that area, or if the plate were to collapse, then the mesh would detach from the anchorage, eventually causing the whole area to collapse.

The aforementioned containment system is normally limited to quasi-static rockfall, since it is considered a non-ductile system, i.e., it contains the detached mass until it reaches its maximum resistance and then collapses. It does not have the capacity to absorb kinetic energy, since concrete in traction is fragile and the wires fail by shear or traction at the points where they are joined. For woven mesh, on the other hand, the wire fails by shearing at the point where two loops meet as disclosed in patent CL 50555 and for electrowelded mesh, failure occurs early in the thermally affected zone. In both cases the steel fails mainly within the elastic range and the area under the curve of the Stress-Strain diagram of the steel (FIG. 15, (D2), which represents the absorbed energy ($\int \delta d\varepsilon$), is minimal, compared to the area under the curve that shows the elastic deformation and permanent plasticity of the wire steel (FIG. 15, (D1).

When the rockburst phenomenon takes place, the tunnel's spalled mass shoots out at high speed and encounters a single or shotcrete mesh that is basically resistant, yet not ductile, both on its surface and at the points of attachment to the anchor bolts and, therefore, this assembly loses its containment capacity and collapses. This is why this system is not applied by itself in tunnels that present this phenomenon. If an anchor bolt fails, these types of shotcrete mesh will not be able to stop the landslide, even if it retains its integrity over most of its surface, because the wires attached to the anchor bolt plates on the periphery of the landslide zone will be cut.

Another problem with the current mesh is that, in order to install it, the anchor bolts must already be in place in the tunnel walls and ceiling, in which case each bolt nut must be removed from the bolt and the plate removed. The mesh is inserted into the protrusion of the anchor bolt, the plate is placed and the nut is replaced. Mixing drilling and anchoring with subsequent mesh placement is very time consuming and inefficient. If the mesh is laid as each anchor bolt is installed, the situation becomes even more complex and takes longer.

There is currently a mesh product that uses very high-strength wire, attached to plates, which in turn connects the bolts together with steel cables. The entire containment capacity of this mesh is based on the use of high-resistance steel wires and cables with high steel consumption per m2 of mesh, which is very heavy and costly, and also requires that the cable on the perimeter of the mesh be tensioned on site between the anchor bolts that surround it, and also, if the plate is bent, the cable will come out of the anchor. It is therefore used only in very specific areas of the reinforcement structure. This arrangement remains non-ductile, because its higher capacity remains proportional only to the range of elastic behavior of the mesh wires and does not take advantage of the energy absorption capacity in the plastic range, which can be more than 3 times the previous value (FIG. 15, differences of areas under the curve between (D1) and (D2). For this system, increasing the mesh capacity with gains in strength and wire diameter and with the formation of an increasingly smaller rhombus, not only increases the weight and cost of the solution, but also poses manufacturing and transportation constraints, since a very strong wire with a large diameter struggles to deform in cold temperatures and form a flattened helical coil, as seen in GB2150950. Thus, the weave of these meshes is very cushioned with almost round spires, which makes them very stiff or not very flexible, so that a lot of concrete must be used to submerge the spires and form the equivalent of reinforced concrete. The stiffness of the mesh in the cross direction also makes it difficult to adjust the mesh to the irregularities of the tunnel wall in its longitudinal direction.

As for the use of electrowelded meshes, these form rigid cloths with nodes affected by welding, which is a mixture of forging and heat on the wires at each crossing. Its behavior is less ductile than the diamond mesh and it is mainly used in regular walls and vaults in areas of large spans and height, with a significant addition of concrete, forming a truly reinforced concrete wall. They are used less frequently than diamond meshes.

There is also an application CL 2288-2012 that discloses a mesh made of interwoven metal wire strips, with a self-rivet placed between the two half-strength strips in each node, which was rejected at the time of processing. This interwoven mesh is a so-called "macro mesh" of band straps that joins all the plates tied together through their grooves.

In the previous patent application, the self-riveting joint between metal strips is weak. For example, for an ASTM A 653 SQ Gr 40 galvanized steel strip, 1.5 mm self riveted with a 1.2 mm strip, the joint withstands 2,024 N (206.5 kgf) in shear (FIG. 16). If the 1.2 mm strip has a creep of 28.12 kgf/mm2, with a width of 25 mm, then it will require a force of 843.6 kgf to start flowing, but shear failure will occur at one quarter of the creep, resulting in a mesh that fails prematurely upon contact of the steel strip with the reinforcing bolt underneath the plate. At the same time, the medium to low strength necessary to self-rivet limits the strength of the strip, which necessitates increasing the section of the strips, increasing only their width, since the self-riveting is limited to 1.5 mm in this type of steel. This mesh by itself cannot resist the weight of a landslide, due to the strength limitations of the nodes. In this case, the "macro mesh" should do the job of holding the mesh in place when it detaches from the plate, but since it does not support the strip mesh and is only superimposed, in the event of a landslide, the weight of the rockfall and its kinetic energy causes the rocks to slip through the space between anchor bolts, along with a good part of the mesh. In addition, self-riveting, while retaining creep and rupture properties in the rivet zone at each node, affects the percentage of elongation to such an extent that practically no energy is absorbed by permanent plastic deformation. In short, this mesh, together with the "macro mesh", does not fulfill the dynamic cargo containment property for rockbursts.

The present invention also solves the following problems encountered in the state of the art:

The first aspect of this system is that it supports the weight of the fallen material by operating elastically and also supports its kinetic energy, due to the phenomenon of rock bursting.

A second aspect is that it can integrate into the tunnel before, during or after the placement of the reinforcement bolts and plates.

A third aspect is that the system is thin and flexible enough to be pre-assembled before placing inside the surface to be covered or supported and then coated with a thin layer of concrete.

A fourth aspect is a simpler installation of the system without the need to remove plates or the nuts from the anchor bolts.

A fifth aspect is the containment of dynamic charges from a rockburst over a wide range of released energies.

A sixth aspect is that the system deployed on-site does not require shotcreting to bond the mesh to the wall.

A seventh aspect is that the system remains anchored to the forcing bolt as long as the nut is in place, without the possibility of detachment due to failure from the punching of the plate.

An eighth aspect is that it can reinforce an already installed reinforcement structure by adding the flat tension wires attached to the plates at a later date.

A ninth aspect is that the system is stiffer than wire mesh, therefore, it holds less material falling out of place.

A tenth aspect is that this system can be designed without metal strip thickness limitations, thereby providing the widest range of rockfall containment performance.

An eleventh aspect is the process of assembling the panel system, putting them in place and temporarily fastening them to the walls and vaults of the tunnel, followed by the drilling of holes, placement of the anchor bolts, placement of the plates and finally the bolting of the nuts that fasten the whole assembly to the tunnel.

A twelfth aspect is to avoid the interference of the simultaneous operations of placing anchor bolts and placing the panels, avoiding accidents and hindrances among the operators.

A thirteenth aspect is to fully link all the panels to each other at their edges.

A fourteenth aspect is that the system prevents rocks from accumulating within the belt network, thus avoiding primary crusher stoppages due to RISES jamming.

A fifteenth aspect is the linear structural continuity of the metal strips with the frame compared to non-linear wire meshes.

A sixteenth aspect is the increased speed of tunnel advancement due to the system's capacity to be pre-assembled prior to installation.

DESCRIPTION OF THE INVENTION

It should be understood that the present invention is not limited to the particular methodology, compounds, materials, manufacturing techniques, uses and applications described herein, as these may vary. It should also be understood that the terminology employed herein is used for the sole purpose of describing a particular embodiment, and is not intended to limit the perspective and potential of the present invention.

It should be noted that for words such as "the system", "part", "element", "use" and "method", here, in the claims and throughout the entire text, the singular does not exclude the plural, unless clearly implied by the context. So, for example, the reference to a "use or method" is a reference to one or more uses or methods and includes equivalents known to those skilled in the art. Similarly, as another example, the reference to "a step", "a stage" or "a mode" is a reference to one or more steps, stages or modes and may include implied and/or supervening sub-steps, stages or modes.

All conjunctions used should be understood in the least restrictive and most inclusive sense possible. Thus, for example, the conjunction "or" should be understood in its orthodox logical sense, and not as an "or excluding", unless the context or the text expressly requires or indicates it. The structures, materials and/or elements described must be understood to also refer to functionally equivalent ones and thus avoid endless taxonomic enumerations.

Expressions used to denote approximations or conceptualizations should be understood as such, unless the context dictates a different interpretation.

All technical and/or scientific names and terms used herein have the common meaning given to them by an ordinary person qualified in these matters, unless expressly indicated otherwise.

Methods, techniques, elements, systems and parts similar and/or equivalent to those described herein may be used or preferred in the practice and/or testing of the present invention.

All patents and other publications are incorporated as references, for the purpose of describing and/or reporting, for example, methodologies described in such publications, which may be useful in connection with the present invention.

These publications are included only information purposes prior to the filing date of this patent application.

Nothing in this regard should be taken as an admission or acceptance, rejection or exclusion, that the authors and/or inventors are not entitled to be authors and/or inventors, or that such publications are back-dated by virtue of prior publications, or for any other reason.

A couple of concepts applied in the present invention are based on the definition of the rockburst phenomenon. We will refer to this phenomenon when there is an effect over 25 kJoules/m2 for Category I rockbursts, up to 75 kJoules/m2 for Category III bursts, defined according to the kinetic energy of the detachment.

Another concept to be described is permanent plastic deformation. This phenomenon states that when a steel strip is stretched, the energy absorbed by this action, once it begins to undergo permanent deformation, is proportional to the area under the tensile test curve of the strip (plotting stress as a function of the unit strain of the steel, as described in FIG. 15). A low carbon steel is ductile with a large area under the curve. A medium carbon steel is tough, with an area under the curve slightly smaller than a low carbon steel. Finally, a high-carbon steel is very strong, but as soon as it begins to deform permanently, it breaks. It therefore absorbs very little kinetic energy from the detachment, i.e., it is non-ductile.

The solution proposed in this design is based on the objective of solving the limitations of the existing containment systems, using solutions based on a panel system of a network formed by a plane of vertical parallel straps, which are superimposed on another similar horizontal plane located between the previous one and the tunnel wall. These straps can be made of medium to high strength steel or other similar material, according to their classification in the ASTM A36 standard (low strength steels with 25, 30 kgf/mm2 of creep do not exceed 30 kgf/mm2, medium strength steels do not exceed 42 kgf/mm2 and high strength steels with creeps above 60 kgf/mm2 and more than 100 kgf/mm2 for those used in cables), without excluding other standards, in order to optimize the area under the Stress-Strain curve and thus its capacity to absorb kinetic energy by permanent plastic deformation. Its elongation percentage will correspond to the type of steel chosen, without being diminished by the system that links its nodes.

In this development, 3 types of nodes will be used to securely fasten the vertical straps to the perpendicular ones, thus obtaining the necessary Punching Resistance that defines the static level of containment of high strength woven meshes, but in this case the union of the nodes will not affect the values of creep resistance or maximum resistance and simultaneously, neither will they decrease their elongation percentage, behaving as if the metallic straps were free of the node fastening. Once this requirement has been fulfilled, the mesh will contain a rockburst (or kinetic energies exceeding 25 kJoule/m2).

In this development, traditional spot-welded joints can be used, up to joints with rivets in node-centered perforations (without self-riveting). In this case, the net will serve as a quasi-static landslide containment where the initial velocity is 0 at the beginning of the landslide, similar to woven meshes, but with the installation facilities that the latter lack.

In order to achieve the property of absorbing energy, the fastenings between nodes are made in such a way as to prevent the cross section from being reduced or affected by material removal in the area where the straps that form the mesh are joined. In other words, there is no transverse or diagonal cut in the section of each of the straps along their entire length, nor is any material removed from the metal straps.

Furthermore, this panel system is formed by a perimeter frame of flat tension wires attached to the flat connections that run underneath the plates within the perimeter. The vertical and horizontal metal straps of the net are firmly attached to this perimeter frame, in a range of dimensions from 16 m wide to 45 m long, preferably 2 m wide by 6 m long, or other size defined by the distance between anchor bolts located on the perimeter of the area to be protected, to form a true containment panel system, since the entire periphery of the netting is solidified at its encounter with the flat tension wires by means of pin-type connections between each node of this netting below the perimeter tension wires. The strap mesh exceeds the perimeter of the frame to create an overlapping area between adjacent panels, which can be covered with shotcrete.

These panel systems come fully assembled by default and only need to be placed under the anchor bolt plates.

There is also an alternative to the aforementioned system of panels with connecting plates, in which the frame is formed by flat tension wires that can be joined on site across their edges to a type of plate that has overlapping and welded rings that allow these tension wires to be fastened. In this case the strap mesh must be placed under the hooped plate and after placing the nut, thereby fastening the flat tension wires subsequently to each hoop where they converge. The strap mesh with the perimeter frame can be later connected to the entire assembly. To this end, the clamps that wrap and tie the frame and the mesh underneath can be placed on site, which means that the mesh should have enough slack to slide and align a complete strap underneath the frame, so that the clamps can be screwed on site.

This development allows the entire system, assembled as a whole, to be designed for the level of energy containment that the expected rockburst may produce, according to the requirements of the different segments of the tunnel, with its anchor bolts, plates—flat connectors—strap mesh—flat tension wire frame—bolts, each one correctly calculated so that there are no weak or undersized elements that could restrict the capacity of the assembly.

This development will largely avoid the current need to use shotcrete, whose purpose is to glue the wire mesh to the tunnel wall, but also to stabilize the spires and prevent the mesh from cracking, because this new strap mesh will not crack, since each node is stabilized independently.

In tunnels that do not need to contain rockbursts and only need to hold partial detachments between anchor bolts, this mesh, without the perimeter frame, also performs better than the current meshes, since it will have greater resistance to shear failure and maintain the elongation property of the steel without alteration in the nodes at the same mechanical number and kg/m2 of steel; it can therefore replace both woven and electrowelded meshes. In addition, due to the advantages of speed and simplicity of installation, time and labor savings can be achieved, but more importantly, the time saved can be used to increase progress at the site, thus improving the productivity of the entire deposit.

Another advantage of this system is that it can be installed in any type of tunnel, by placing the mesh with the hooked plate. Over time, if the dynamics of the deposit reveal a higher risk of landslides, then it can be reinforced with a frame made of flat tension wires.

The assembly will thus potentially achieve both capabilities, avoiding the problem of when to use one type of mesh or the other. In other words, the initial solution, which becomes insufficient, can be reinforced by the frame and thus serve to contain and absorb rockburst energy, which could avoid having to install the complete system from the outset, when the tunnel seems to present no problems.

In critical and more demanding areas, this development allows for the generation of an absorption and containment solution tailored to these requirements, without the rigidity limitations of thick and high-strength wires, since the metal strips are easy to bend and accommodate in both directions and do not require cold forging.

BRIEF DESCRIPTION OF THE FIGURES

The following symbols are used:
(1) Longitudinal strap
(2) Cross Strap
(3) Panel perimeter longitudinal straps, 3-1 and 3-2 are joined with rivets.
(4) Perforated outer edge of cross mesh
(4) Perforated outer edge of longitudinal mesh
(6) First buckle
(7) Second buckle
(8) Third buckle
(9) Point weld
(10) Rivet
(11) Square plate
(12) 3-way flat connector
(13) 5-way flat connector
(14) 8-way flat connector
(15) 4-way flat connector
(16) Fourth buckle to tie multi-loop tension wires of similar steel straps to a strap pin.
(17) Flat tension wires
(18) Clamp attaching the mesh to the perimeter frame at each point where they overlap.
(19) Panel system
(20) Frame
(D1) Layout of a 3-way flat connector
(D2) Layout of a square plate
(D3) Interaction between the square plate and the 3-way flat connector
(D4) Overlapping the square plate with the 3-way flat connector
(D5) 3-way flat connector arms.
(D6) Close-up of the joint of the first buckle with two straps in perpendicular position.
(D7) Plate and ear flap assembly
(D7-1) Assembly of plate with ear flaps attached to flat tension wires made of metal strips.
(D8) Close-up of folding of the second buckle
(D9) Close-up of tabs opening on second buckle
(D19) Close-up of folding of the third buckle
(D11) Close-up of the ear flaps welded on the square plate
(D12) Close-up of the interaction between the pin and soldered ear flap
(D13) Solid steel cylinder pin with notches
(A1) Separation distance of the cross strips
(A2) Separation distance between the longitudinal strips
(A3) Parallel grooves per strip surface
(I1) Interaction between anchor bolts and their plates without mesh deformation (I2) Interaction between anchor bolts and their plates with deformation, without the strips connecting the plates.

(I3) Interaction between anchor bolts and their deformation plates and with the straps between plates.

Figure 1:
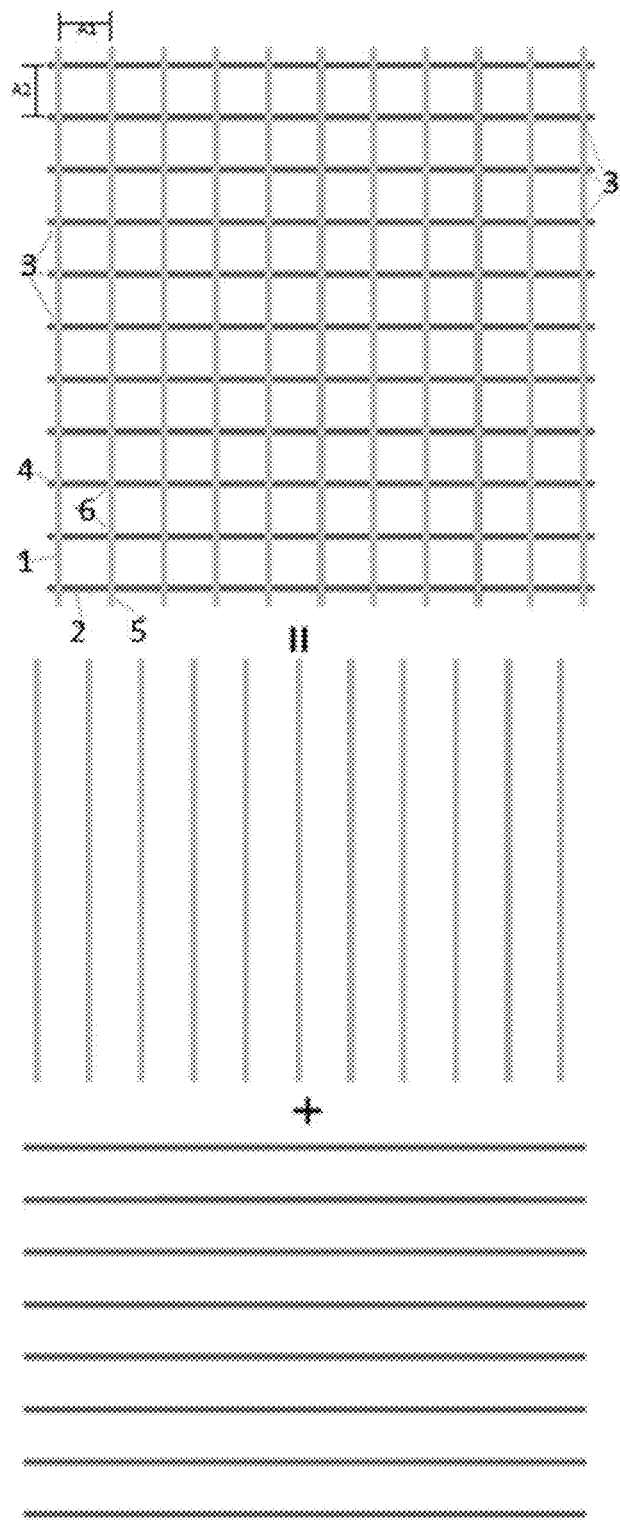

C1: A pair of replacement eight-way flat connectors (I4) at that point of the central node, if this was an entire panel without overlap.

FIG. 1:

This figure represents the mesh made of cross and longitudinal straps, with the solution, for example, of the first Buckle (6) and the perforated ends of the longitudinal and cross straps, with a curved edge, where the numbers correspond to:
- (1) Horizontal strap
- (2) Cross Strap
- (3) Panel perimeter longitudinal straps, 3-1 and 3-2 are joined with rivets.
- (4) Perforated outer edge of cross mesh
- (4) Perforated outer edge of longitudinal mesh
- (6) First buckle
- (A1) Separation distance of the cross strips
- (A2) Separation distance between the longitudinal strips

FIG. 2

This figure depicts the sequence of steps a) to d) for positioning the first buckle (6) connecting the two perpendicular straps. Finally, there is a double deformation of the buckle in its center to improve the adherence of the strips in the node, where the numbers correspond to:
- (1) Cross Strap
- (2) Longitudinal strap
- (6) First buckle
- (D6) Close-up of the joint of the first buckle with two straps in perpendicular position.

FIG. 3

This figure depicts the sequence of steps a) to d) for positioning the second buckle (7) connecting the two perpendicular straps. Two parallel grooves per face (A3) are added to the straps and two parallel segments are sheared, where only one tab per strap will be lodged, so that the joint locks and does not slip. These tabs are at 90° from one another, asymmetrical in width and are punched on the flat side of the buckle, opposite each other. The buckle wraps around both metal bands at the edges, where the numbers correspond to:
- (1) Horizontal strap
- (2) Cross Strap
- (7) Second buckle
- (A3) Parallel grooves per strip surface
- (D8) Close-up of folding of the second buckle
- (D9) Close-up of tabs opening on second buckle

FIG. 4

This figure depicts the sequence of steps a) to d) for positioning the third buckle (8) connecting the two perpendicular straps. Two parallel grooves per face (A3) are added to the strips and two segments are punched where the folded edges will be placed, so that the joint locks and does not slip. The buckle wraps both metal straps around the edges of the punched grooves, where the numbers correspond to:
- (1) Horizontal strap
- (2) Cross Strap
- (8) Third buckle
- (A3) Parallel grooves per strip surface
- (D19) Close-up of folding of the third buckle

FIG. 5

The figure shows the joining of two woven strips according to the following assembly steps a), b) and c) and a spot weld (9), in three points, which prevents more than one welding point from joining in the same cross section of any of the two straps, thus minimizing the structural weakening of the welding area of the nodes. The sequence of assembly stages a), b), d) and e) represents the option of using pre-drilled straps in the nodes and the placement of a rivet (10), where the numbers correspond to:
- (1) Horizontal strap
- (2) Cross Strap
- (9) Point weld
- (10) Rivet

FIG. 6

This figure depicts a square plate (11), with a conical section and welded hooks that allow the possibility of placing flat tension wires with a pin that connect this plate with any of the others, thus forming a perimeter frame of the panel, where the numbers correspond to:
- (11) Square plate
- (D11) Welded ear flaps
- (D12) Interaction between the pin and soldered ear flap
- (D13) Solid steel cylindrical pin with notches at the ends to hold the steel band in the ear flap of the plate to prevent it from slipping.

FIG. 7

This figure depicts a square arrangement of a panel system for linking the hooked plates (11) to each other by means of flat tension wires of high-strength strapping, thereby forming a frame over the mesh. This frame can also be placed after installing the mesh, where the numbers correspond to:
- (D7) Plate and ear flap assembly
- (D7-1) Assembly of plate with ear flaps attached to flat tension wires made of metal strips.
- (11) Square plate

FIG. 8

This figure depicts the layout of a mesh made of vertical and horizontal straps, buckle type connectors, a perimeter frame made of flat tension wires and pins that secure the mesh to the frame, where the numbers correspond to:
- (18) Clamp attaching the mesh to the perimeter frame at each point where they overlap.
- (19) Panel system

FIG. 9

This figure depicts a section between 4 anchor bolts with their plates, where the numbers correspond to:
- (I1) Interaction between anchor bolts and their plates without mesh deformation (I2) Interaction between anchor bolts and their plates with deformation, without the straps connecting the plates.
- (I3) Interaction between anchor bolts and their deformation plates and with the straps between plates.

FIG. 10

This figure depicts 4 different types of flat connectors, to join the flat tension wires and form the frame of the panel system made of steel plates with arms and slots, with a folded tab on each arm for receiving the flat tension wires (D6), where the numbers correspond to:
- (12) 3-way flat connector
- (13) 5-way flat connector
- (14) 8-way flat connector
- (15) 4-way flat connector
- (16) Fourth buckle to tie multi-loop tension wires of steel straps similar to a strap pin.
- (D1) Layout of a 3-way flat connector
- (D2) Layout of a square plate
- (D3) Interaction between the square plate and the 3-way flat connector
- (D4) Overlapping the square plate with the 3-way flat connector
- (D5) 3-way flat connector arms.

(D6) Close-up of the joint of the first buckle with two straps in perpendicular position.

FIG. 11

This figure depicts the layout of the straps that form the frame with the flat connectors, which form the flat tension wire with two or more turns of the strap, according to the design requirements, where the numbers correspond to:
(12) 3-way flat connector
(16) Fourth buckle to tie multi-loop tension wires of steel straps similar to a strap pin.
(17) Flat tension wires
(D5) 3-way flat connector arms.
(D6) Close-up of the joint of the first buckle with two straps in perpendicular position.

FIG. 12

This figure depicts a frame with flat connectors that go under the plates, joined to the other flat tension wires that connect each anchor point. Diagonal tension wires can be used as an exception because they prevent the plastic deformation of the strap mesh, which is the one that finally absorbs the kinetic energy of the rockfall, where the numbers correspond to:
(12) 3-way flat connector
(13) 5-way flat connector
(15) 4-way flat connector
(16) Fourth buckle to tie multi-loop tension wires of steel straps similar to a strap pin.
(17) Flat tension wires

FIG. 13

This figure: depicts the transverse overlap of two strap panel systems with their respective flat tension wires and flat connectors already interconnected. The flat connectors are placed on top of each other at the anchorages where they meet and the complete frame of each panel system overlaps all adjacent panel systems.

FIG. 14

This figure depicts the overlapping of 4 mesh panel systems with flat tension wires and flat connections, where the numbers correspond to:
C1: A pair of replacement eight-way flat connectors (14) at that point of the central node, if this was an entire panel without overlap.

FIG. 15

This figure depicts a graph of the Stress-Strain diagram with respect to the wires used in mesh formation. On the left of the figure we can see the areas under the strain-to-rupture curve within the elastic range plus the plastic range: First, the response is a high carbon steel that is very strong, but has a low deformation capacity; second, a medium carbon steel with a mixed response, tenacious, in the sense that it has a high stress resistance and also a high deformation capacity; and finally, in the same graph, a third low-carbon wire with a very good deformation capacity but with low stress resistance, or a more ductile wire. This development is intended for mixed or tenacious behavior. The graph on the right shows the integral of the area under the curve of the diagram depicted on the left, where the behavior of the three different types of wire against deformation up to rupture is shown, only from the elastic range of the wire.

FIG. 16

This figure shows the force required to separate two straps when cutting or tearing. The figure on the upper left shows the direction of movement generated on overlapping straps (self-riveting shear), and the figure on the lower left shows the direction of the movement generated on straps when peeling or shearing. The underlined data show the resistance value of a joint of two plates, the first of 1.5 mm and the second of 1.2 mm at the most. In this case, when shearing, self-riveting resists 2024 N (206.5) and when pulling out it resists much less, only 823 N (84.0 kgf).

FIG. 17

Figure 17:
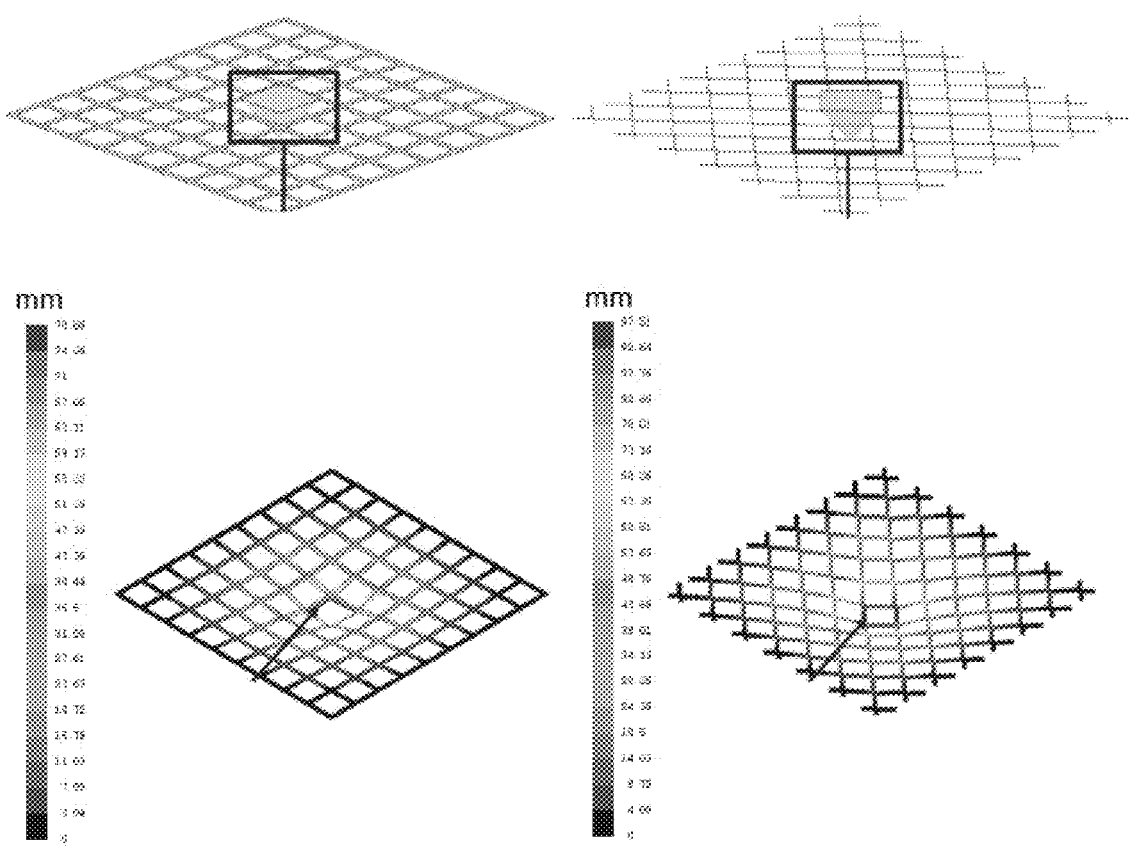

FIG. 17 provides a schematic of the tests showing the layout, on the right, of the braided mesh and, on the left, of the panel system in front of the pyramidal punching test. The diagrams above show the punch simply placed on the surface. The diagrams below show in grayscale the forces exerted on each surface being tested.

FIG. 18

Figure 18:
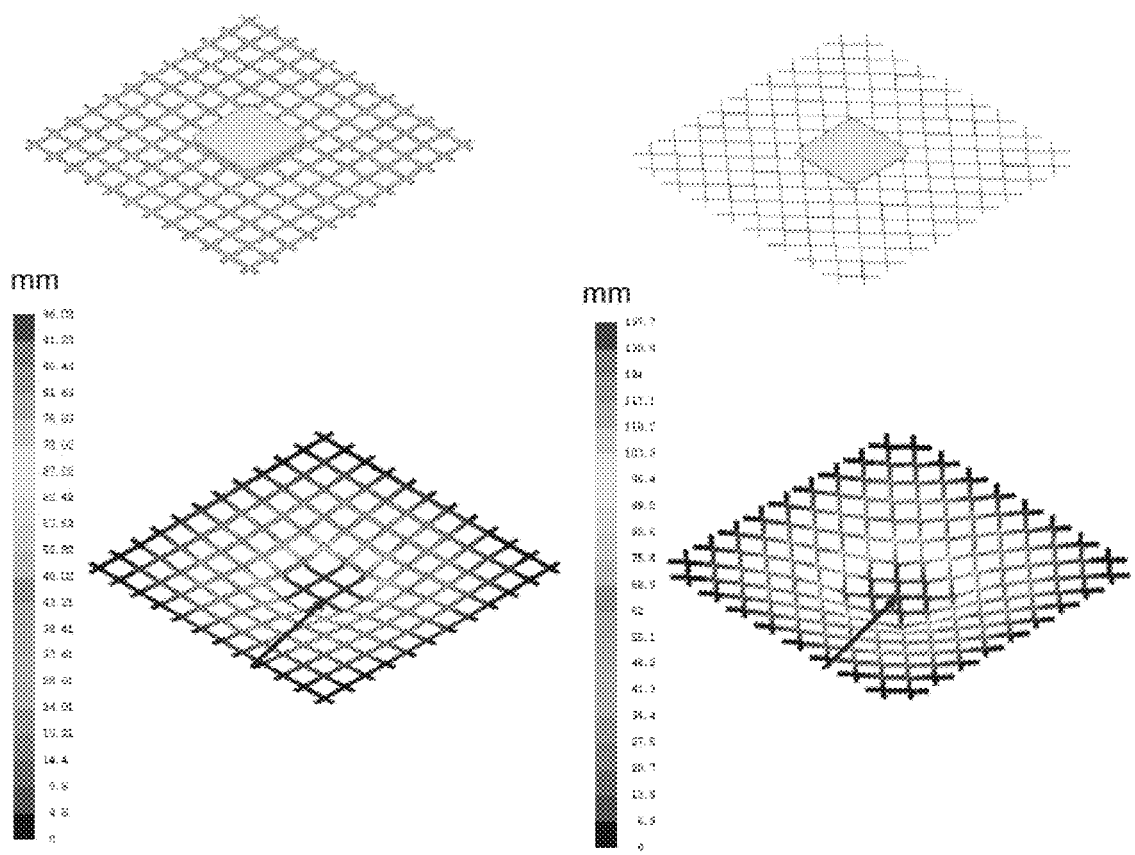

FIG. 18 provides a schematic of the tests showing the layout, on the right, of the braided mesh and, on the left, of the panel system in front of the flat plate test. The diagrams above show the plate simply placed on the surface. The diagrams below show a color scale of the forces exerted on each surface being tested.

FIG. 19

This figure provides a schematic of the types of tests to be performed on the braided mesh and on the panel system of this invention through a rigid plate or a flexible volume.

FIG. 20

This figure provides a schematic of the tests showing the layout, on the upper right, of the panel system and, on the upper left, of the braided mesh against the rigid plate impact test. The diagrams below show the equivalent stress at break for the braided mesh (left) and the panel system of this invention (right). The lower right curve shows the response between force v/s displacement and energy absorbed in the rigid plate impact study. (Note: where it says Garibaldi, this refers to a panel of this invention).

FIG. 21

This figure provides a schematic of the tests showing the layout, on the upper right, of the panel system and, on the upper left, of the braided mesh against the flexible volume impact test. The lower schematics show the equivalent stress at rupture for the braided mesh (Left) and the panel system of this invention (Right). The lower right curve shows the response between force v/s displacement and energy absorbed in the flexible volume impact study. (Note: where it says Garibaldi, it refers to a panel of this invention).

FIG. 22

This figure displays a bar graph that clearly shows the ability of the panel system of this invention to absorb more than twice the energy capable of being absorbed by a braided mesh in response to an impact test (Note: where it says Garibaldi, this refers to a panel of this invention).

DETAILED DESCRIPTION OF THE INVENTION

Figure 2:
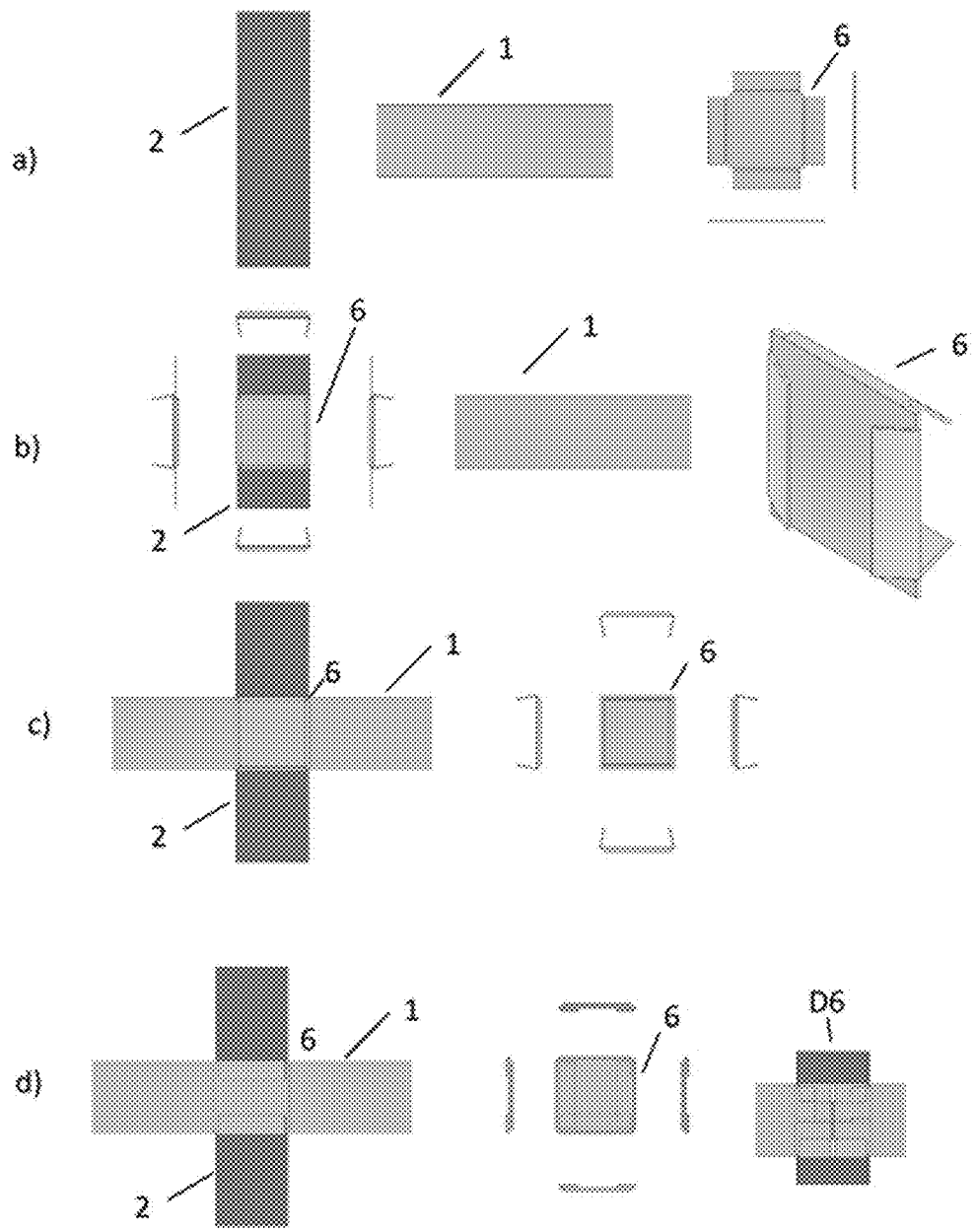
Figure 8:
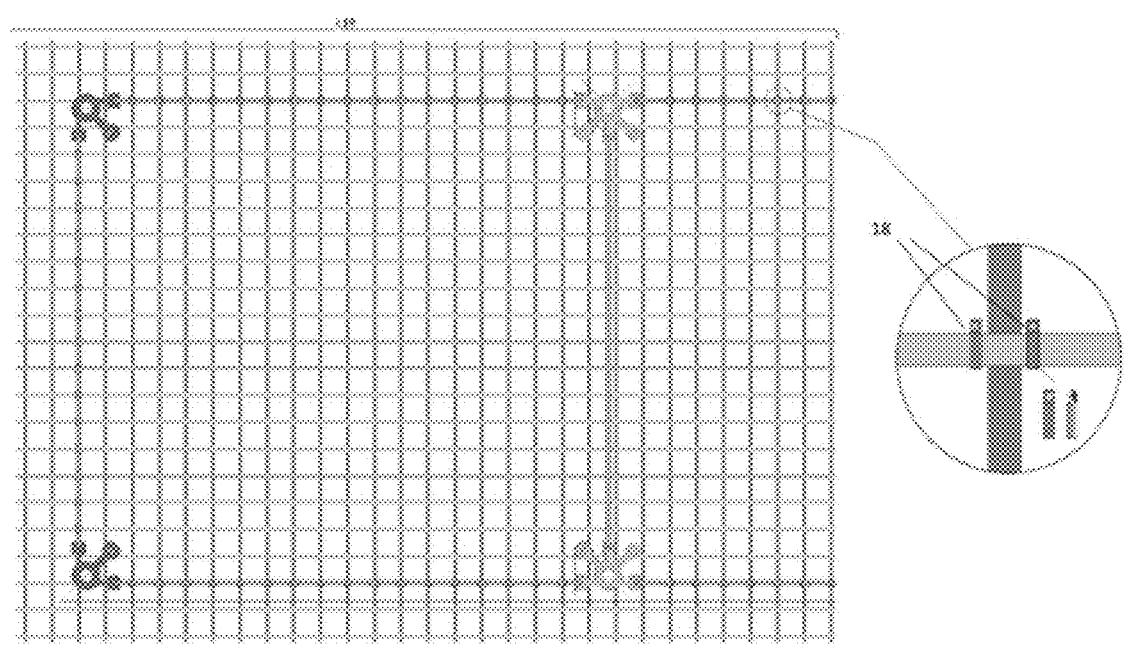

This development describes a panel system (19) for rockfall and rockburst containment, as shown in FIG. 8, in tunnels for this development, which is attached to the wall or vault by means of anchor bolts and plates, consisting of a mesh, as shown in FIG. 1, made of parallel longitudinal metal strips or other material resistant to traction, and that the material's tearing happens longitudinally, not cutting through it, superimposed on similar cross strips at 90° in the same plane. The nodes where the longitudinal strips cross perpendicularly to the panel system (19) with the cross strips are firmly secured with metal buckles, spot welding or rivets, as seen in FIGS. 2; 3; 4 and 5. The outer edges of the mesh in the longitudinal and transverse directions have perforated ends (4 and 5) and rounded edges, which facilitate their on-site placement, and the outer strips at all ends of the mesh can be interwoven or can be placed and anchored on only one side of the perimeter strips. These strips, if made of steel, can be galvanized, painted or coated to protect them against corrosion. Different grades of steel strip can be used, characterized by their creep resistance, breaking strength and elongation. They can be heat treated or be as the coil from which they are cut. The surface texture may be the same as the one resulting from the coil from which it is strapped; that which results from cold rolling, or that which results from routing or other similar surface treatment.

The strips (1 and 2) in FIG. 1, may have the same size and steel grades over the entire surface of the mesh, but there may also be strips of different sizes and steel grades, according to specifications laid out within the mesh plan. Thus, both the width of the strips (1 and 2) and their thickness can be equal or different, depending on the desired performance. Similarly, the sizes of the grid (A1 and A2) can be the same or different, resulting in a square or rectangle respectively. It is possible that, over the cross section of the mesh, some areas may have different sizes. The common thicknesses of steel strips are 0.41 mm; 0.43 mm, 0.46 mm; 0.51 mm; 0.56 mm; 0.58 mm; 0.64 mm; 0.71 mm; 0.75 mm; 0.79 mm; 0.85 mm; 0.89 mm; 1.00 mm; 1.12 mm; 1.20 mm; 1.27 mm; and 1.41 mm. The preferred widths are 15 mm; 15.87 mm; 19 mm; 19.05 mm; 25 mm; 25.4 mm; 30 mm; 31.75 mm; 40 mm and 50 mm. The strips may have other thicknesses and widths.

A variety of buckle and fastening solutions are available between the strips, made of galvanized or painted steel, of varying qualities and thicknesses. The usual thicknesses used for steel buckles are 0.5 mm, 0.85 mm, 1.0 mm and 1.6 mm, and other thicknesses can be specified, with different structural properties. Their geometric shapes are as follows: FIG. 2 shows the first buckle (6) made of a steel plate with cuts at the corners, leaving the tips between the tabs at the four corners, or otherwise. Opposing tabs on one face of the buckle are bent to one side at an approximately 90° angle to that face, while those perpendicular to them are bent to the opposite side at a similar angle, resulting in a saddle geometry. The first buckle (6) is placed around one strip in step b), then the other strip is placed perpendicularly in step c), leaving the buckle between the two strips. Finally, in stage d) the tabs are flattened to closely embrace both perpendicular strips and to improve the adhesion between these 3 elements, both tabs are simultaneously flattened with a kind of wedge or chisel to leave a mark and a fold on each opposite face and at 90°, as shown in the detail drawing (D6). In this setup, none of the strips are damaged or punctured and are only linked by the mechanical friction of the buckle. This type of buckle allows the strips to slide at the nodes, in the face of external loads, yet favoring the integrity of each cross-section of the strips, giving it a high permanent plastic deformation capacity before it eventually ruptures, maximizing the absorption of kinetic energy in a rock burst.

Figure 3:
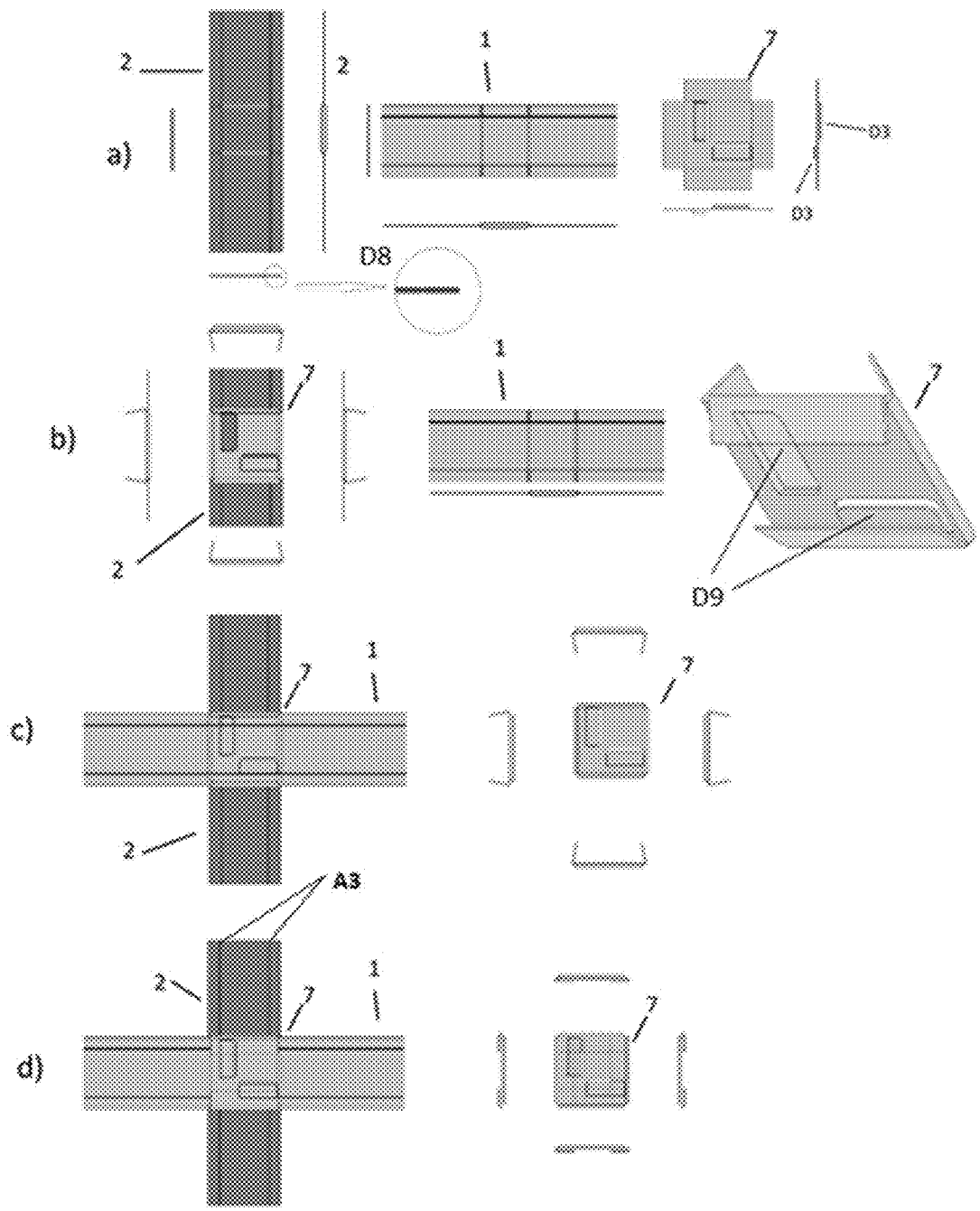

The second buckle (7) described in FIG. 3, is similar to the previous one, but in addition to wrapping and embracing the strips by its outer edges, it has two minor tabs perpendicular to each other (D2), not centered on its face, which open opposite to each other on their die-cut face. The strips have two slight longitudinal parallel grooves on both faces that do not cross the section, according to item A3. In addition, in these grooves, in the area where the strips cross, a shear separates the ends to one side and the central area to the opposite side, producing two parallel open grooves of equal length, one in line with the other. In these grooves, one buckle tab is inserted in one strip and the other tab in the other strip perpendicular to it. The purpose of this groove is to prevent the buckle and node from slipping as the minor tabs wedge into the sheared grooves. If due to this stress, the end of the grooves were to break or rip along the smaller tabs inside them, then the sheared A3 grooves would prevent the tear from spreading diagonally and affect the cross-section of the strip, since it should propagate along the bottom of the grooves longitudinally. Thus, this buckle firmly secures both strips at the nodes and at the same time does not diminish their respective cross sections in any way, thus avoiding affecting the full elongation range of the steel of the strips. This allows both straps to reach their full elongation property and strength values as if they were a fully sound, grooveless strap. This joint can also maximize the energy absorption in the plastic range of the steel in the event of a rock burst.

Figure 4:
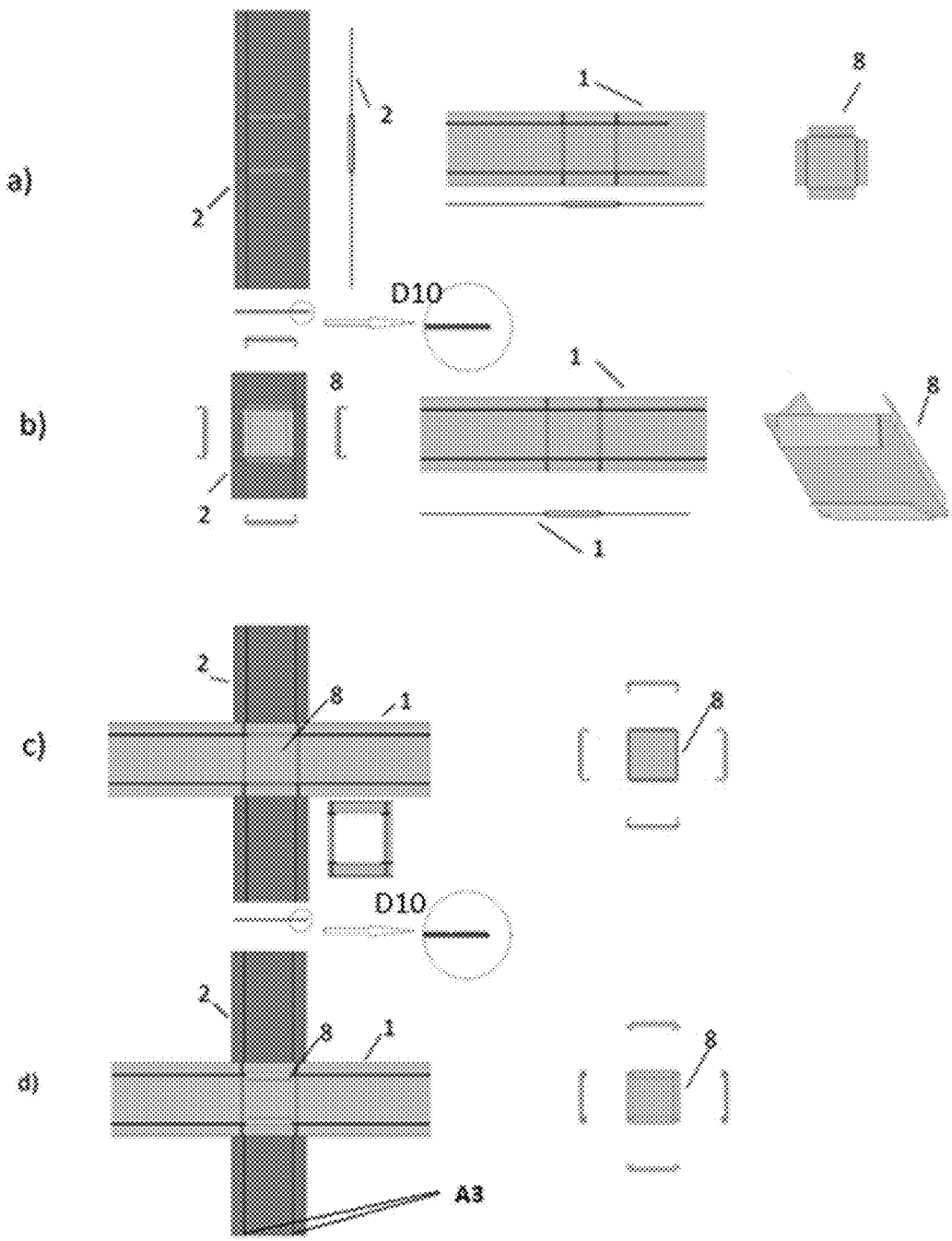

The third buckle (8) (described in FIG. 4), is similar to the first buckle (6), but smaller, while both strips have longitudinal grooves similar to the one shown in FIG. 3. But in this case the outer tabs wrap around the edges of the parallel sheared grooves on the inside face of both straps in opposite directions. This way, both straps are joined together in a stable node that does not tear or rip apart.

Figure 5:
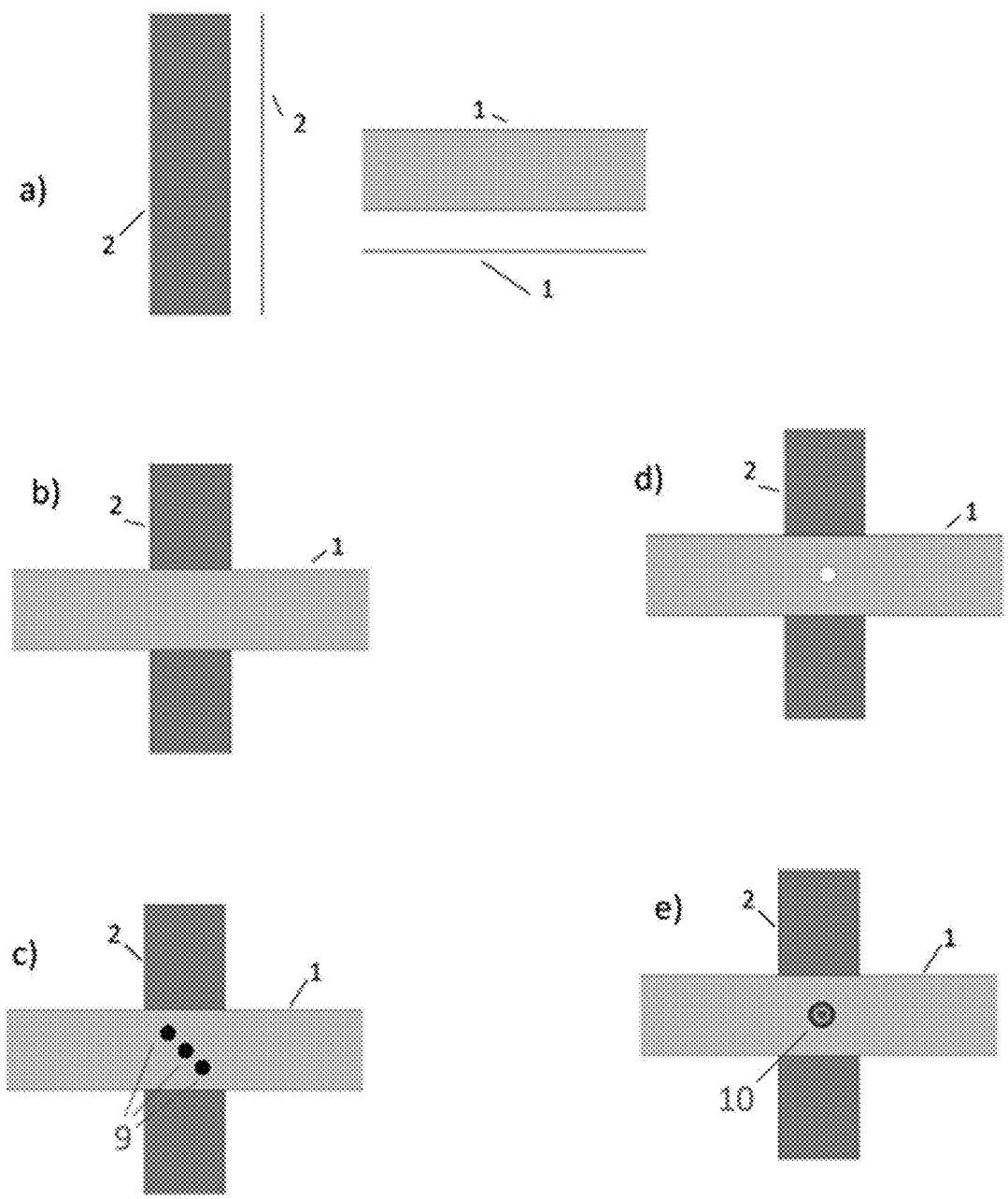

FIG. 5 depicts a three-point diagonal welded joint (9) at the intersection of the two steel strips in step c), which minimizes damage to the mechanical properties of the strips by distributing the shear-working area into three small zones, instead of into a single zone equal to the sum total of the three areas. The diagonal layout allows only a small cross-section to be thermally affected on both strips at a time. This also minimizes the elongation drop, as each metal strip is pulled longitudinally while the perpendicular one has already been welded.

FIG. 5 in stages d) and e) each show two perpendicular straps with a pre-drilling centered on the node, through which an expansion rivet is passed to fasten each node. At this point, we expect that there may be a decrease in creep and rupture strength proportional to the diameter of these perforations, relative to the width of the metal strips. It is also expected that the elongation will be affected to a lesser extent as there is a zone of stress concentration. All actual measurements of these properties have been included in the design criteria for the entire mesh.

Figure 6:
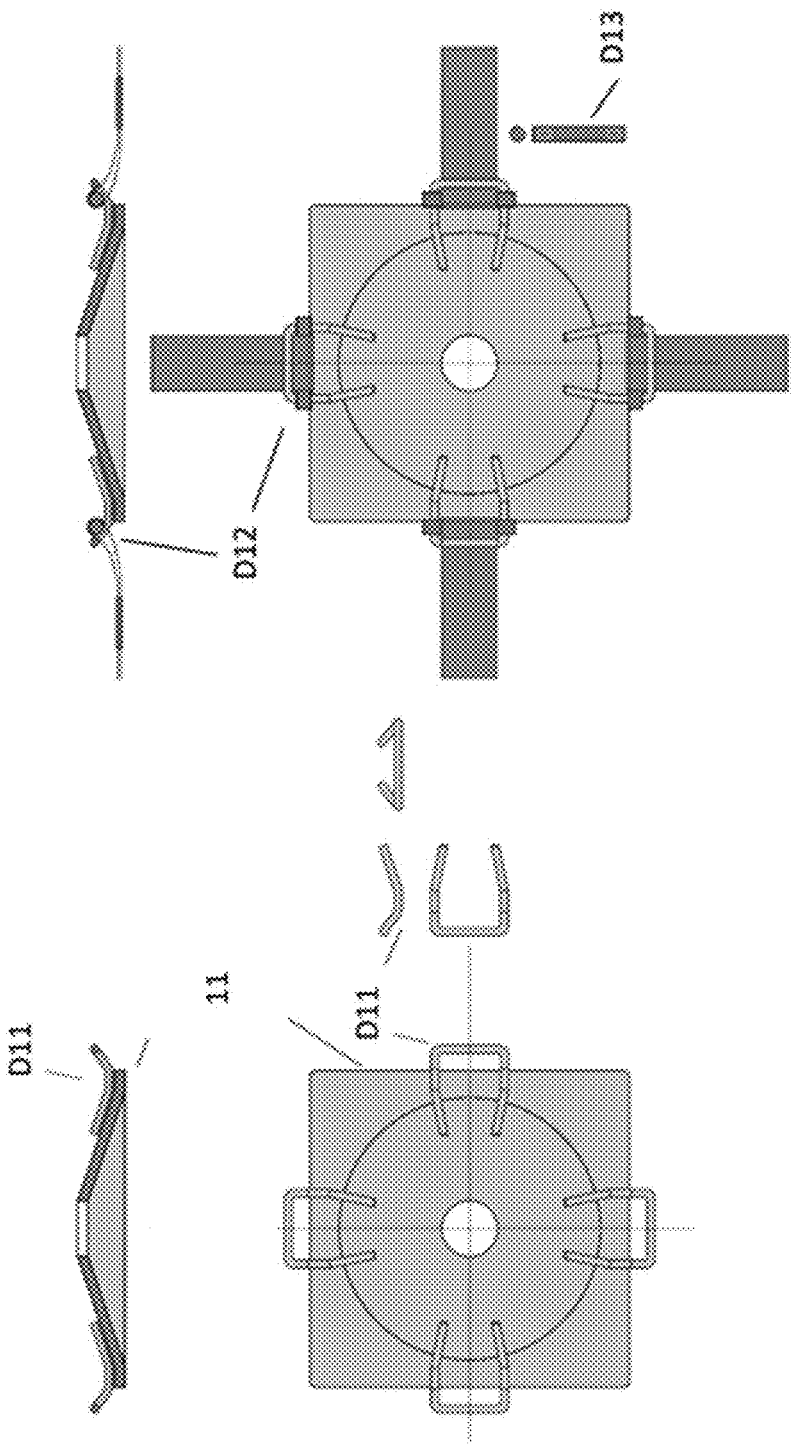

FIG. 6 shows the plate (11) that is part of this development, corresponding to a square of measures equal to or greater than 150 mm, with a central perforation through which the anchor bolt passes and where the nut of this bolt is supported and four ear tabs (D11) or more are welded on the outer surface of the plate, made of a smooth bent round, pointing in the direction where the flat tension wires (17) are placed.

These ear flaps will be used to pass the high-strength straps that make up the flat tension wires (17) that will form the frame that joins the plates to each other. The plate shall be of medium strength steel, stamped in a conical shape and of a typical thickness of 10 mm or more, according to specification. As an exception, this plate may be joined with high-strength flat tension wires with up to eight neighboring plates, but normally it will only have ear flaps for the flat tension wires of the frame forming a rectangular perimeter. This plate (11) with ear flaps (D11) can also be placed on top of a normal plate, if necessary for resistance or for ease of assembly.

Figure 7:
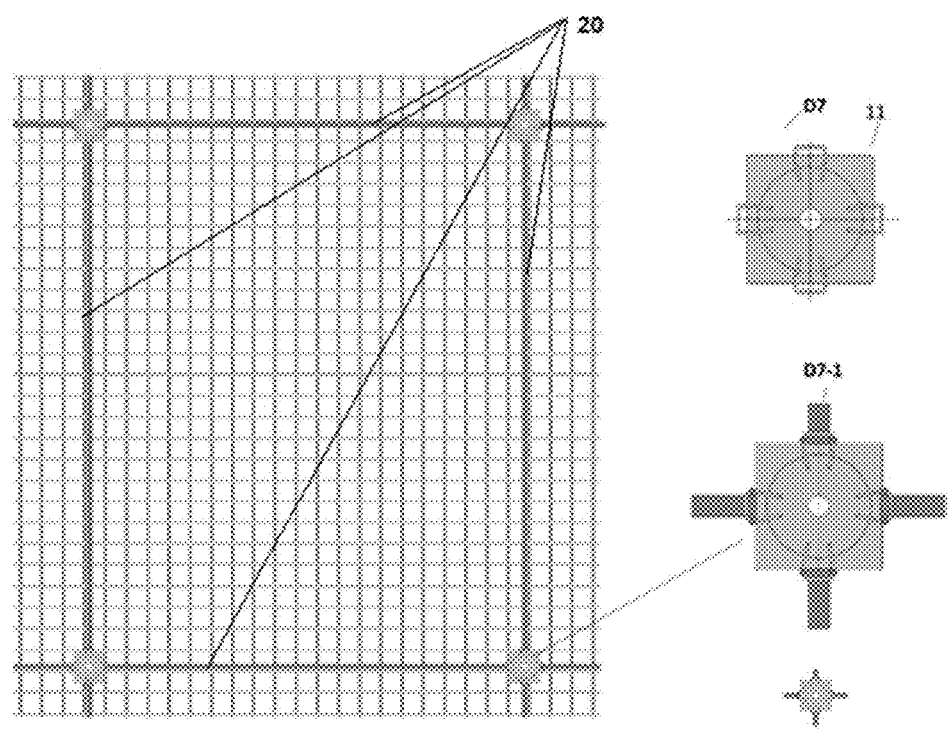

FIG. 7 depicts a square or rectangular layout for linking the plates (11) together by means of the flat tension wires (17), made of two or more high-strength steel straps, thereby forming a frame over the mesh. This frame is mounted after the mesh has been installed, using a pin (D13) described in FIG. 6 that traps it in ear flap D11. The metal straps that form the frame are placed between two plates passing through the ear flaps. In the exception that this was a single metal strap, the loop of each end is secured with a fourth buckle (16) or with a cold embossing similar to that used in strapping for bundling. For two loops, the two ends of the metal strap can be joined together where they meet, using the aforementioned method. For a greater number of loops, buckles may be used at both ends of the flat tension wire (17) as described in FIG. 11.

Figure 10:
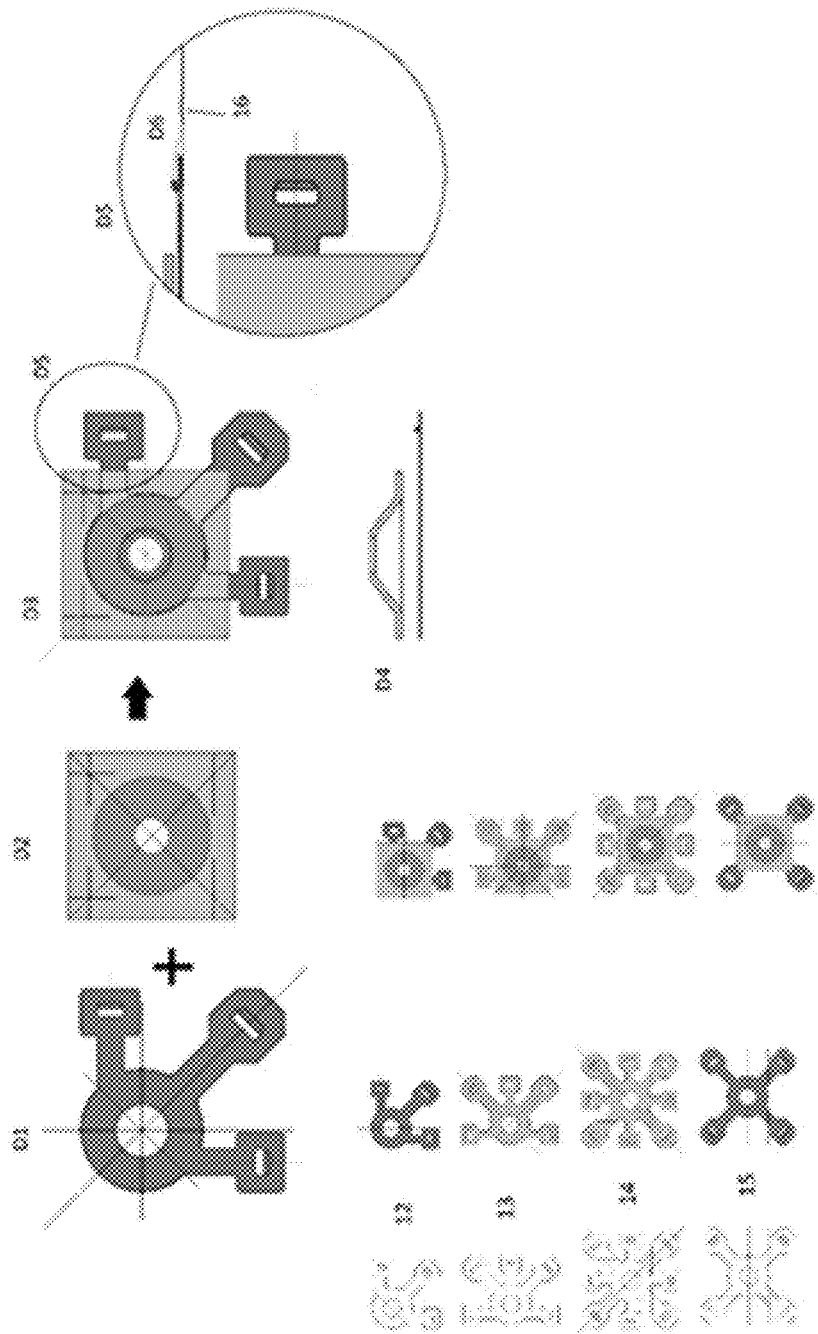
Figure 12:
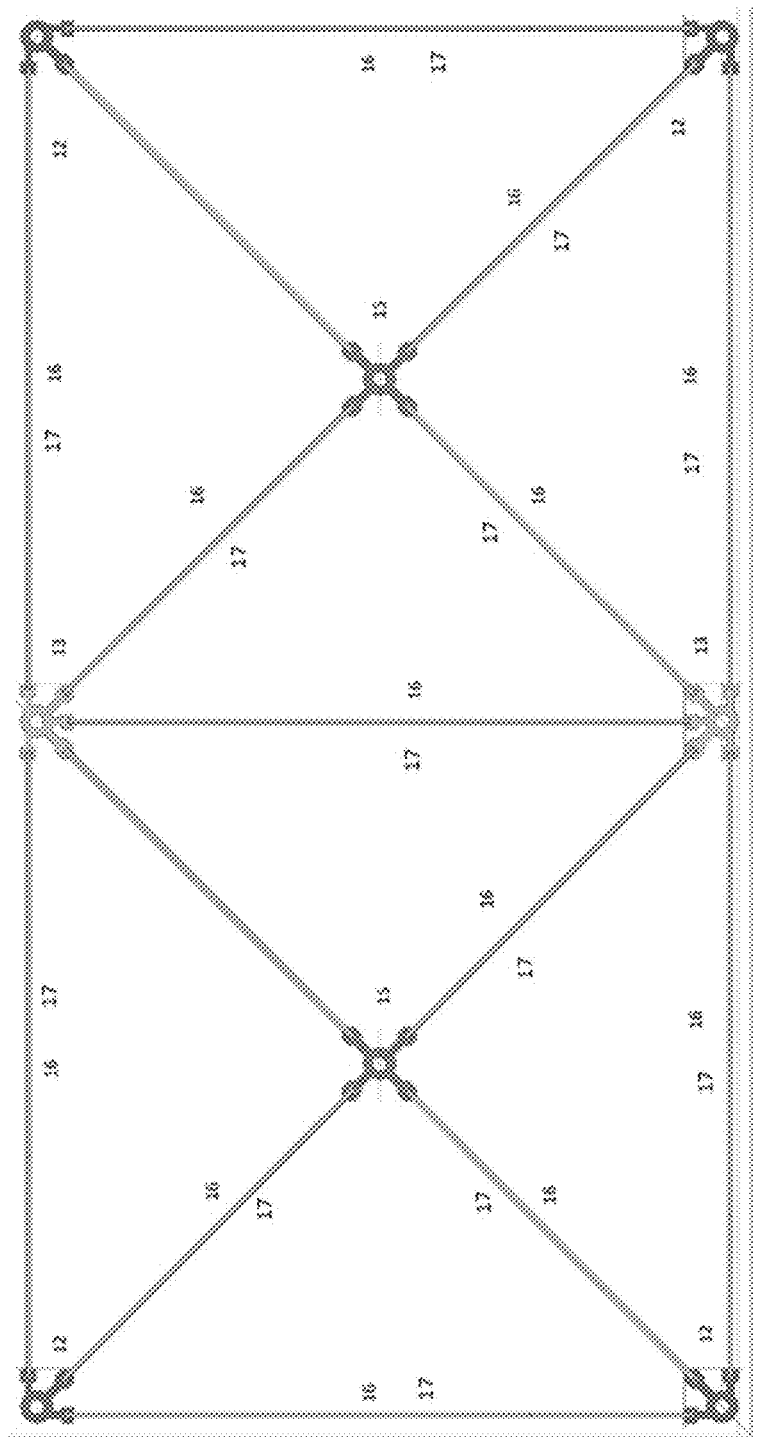

Similar to FIG. 7, in FIG. 8 we may observe a frame layout, but with flat connections (11), (12), (13) and (14), which will be placed underneath the plates as in FIG. 10. In areas needing a greater reinforcement that may become very evident in the tunnel under development, but that could also emerge some time later due to deposit dynamics, it will be possible to add flat tension wires (17) diagonally, as shown in FIG. 12.

Figure 9:
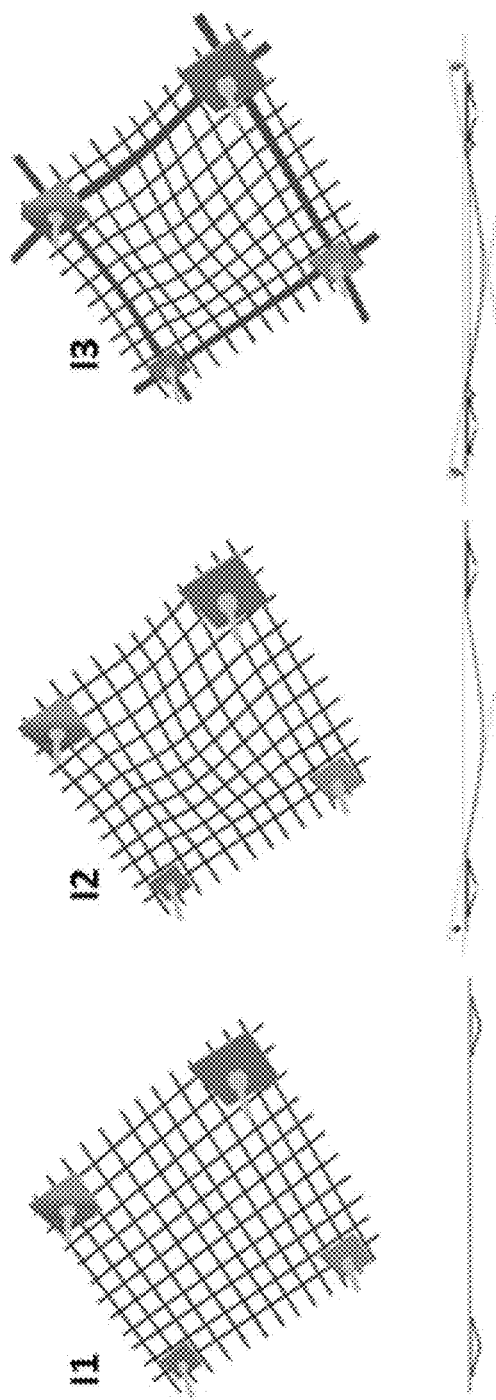

FIG. 9 shows a section between 4 anchor bolts with their plates, with no deformation of the mesh in I1 because there is no deformation of the tunnel. In close-up drawing I2 there is a deformation corresponding to a landslide due to a small rock explosion. Here, the mesh is shown without the flat tension wires that connect the plates (11) and therefore, the upper strips of the mesh, between the four anchor bolts, are dragged down and can hold the ejected material. The close-up diagram I3 shows that the deformation is contained with the flat tension wires, between the plates (11), which also carries the loads to the neighboring anchor bolts, not overloading the mesh by holding too much rock. This is very effective when the rockburst occurs on vertical or slightly inclined walls, since much of the rockfall will rest on the lower part of the unaffected wall.

FIG. 10 shows the flat connectors (12), (13), (14) and (15) with stage sequences D1, D2 and D3, in which the flat connection (12) is covered with a normal plate to place the nut and secure the anchor to the whole assembly. The arms of the flat connectors emerge from the plate and connect to the flat tension wires (17).

Figure 11:
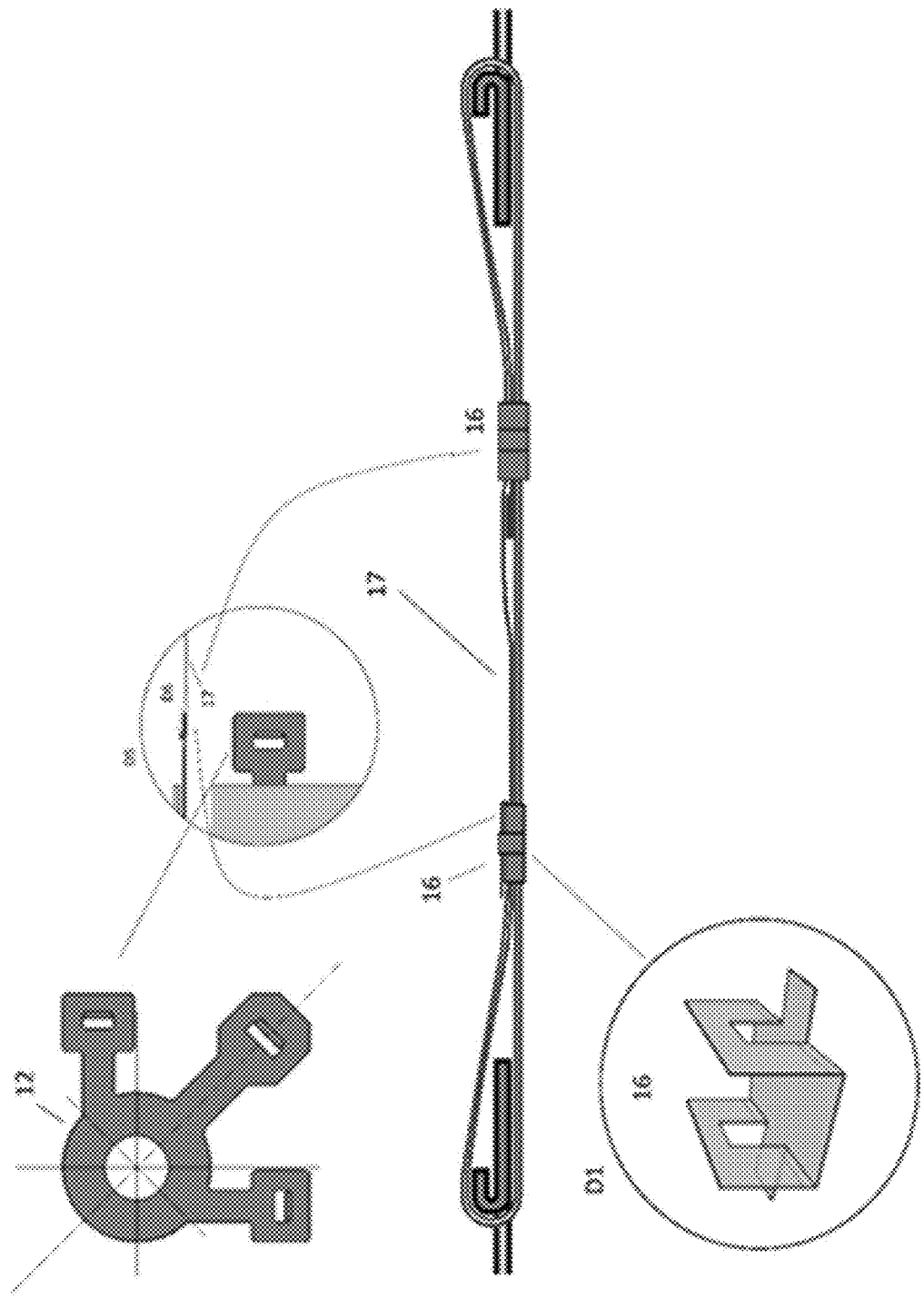

FIG. 11 shows as an example the flat connector (12) formed by low thickness plates of 3 mm or more, with a folded tab on the connection arm with the flat tension wires of the frame (17) as an alternative to the panel system (19) with a pre-installed frame, so that these flat connectors are placed underneath the plates on the anchor bolts during installation on site, thus avoiding having to install the flat tension wires (17) on each flat connector in the tunnel. This alternative of a mesh with a pre-installed frame significantly reduces tunnel works, since the panel system (19) is supplied ready to use.

FIG. 12 shows the layout of a special frame with the exceptional addition of diagonally arranged flat tension wires (17). These flat tension wires (17) are placed by joining four anchor bolts and are justified only when it is necessary to reinforce that area of the tunnel due to potential landslides, but without rock bursting. The flat tension wires (17) in the shape of an "X" stiffen the strap mesh and can reduce the capacity for permanent plastic deformation.

Figure 13:
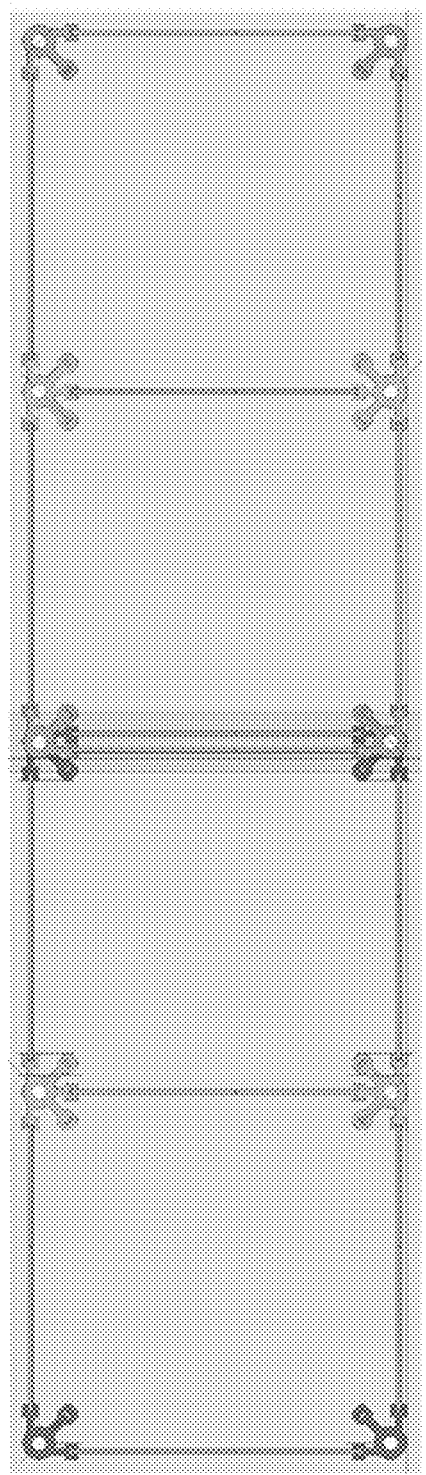

FIG. 13 corresponds to two longitudinally overlapping panel systems (19) with their respective frames in a simple layout, with flat connectors and flat tension wires (17) connecting each anchor point. The frames of both panels are overlapped and fastened to the anchor bolts and the edges of the mesh protrude from the frame's edges on all four sides to help give continuity to the assembly, with the possibility of adding a thick shotcrete in the overlapped area according to specification. Note that the flat connectors (12), (13) and (14) (FIG. 6) of each node, can always overlap on the anchor bolt with the adjacent panel, without disturbing or crushing the arms where the flat tension wires (17) are placed. These flat connectors do not interfere with each other and the web straps overlap at the meeting perimeter without size limitations, achieving great continuity in all panel system joints and actually forming a single panel system in the entire tunnel sector. Thus, each anchor bolt is able to connect a mesh panel system with the other panels and also form a continuous frame as a single element for the entire protected surface of the tunnel.

FIG. 13 shows the overlap of two mesh panel systems with installed frames. The chamfer represents the mesh of metal strips and can exceed the limits of the frame as much as needed in order to let users define the overlap (darker chamfering).

Figure 14:
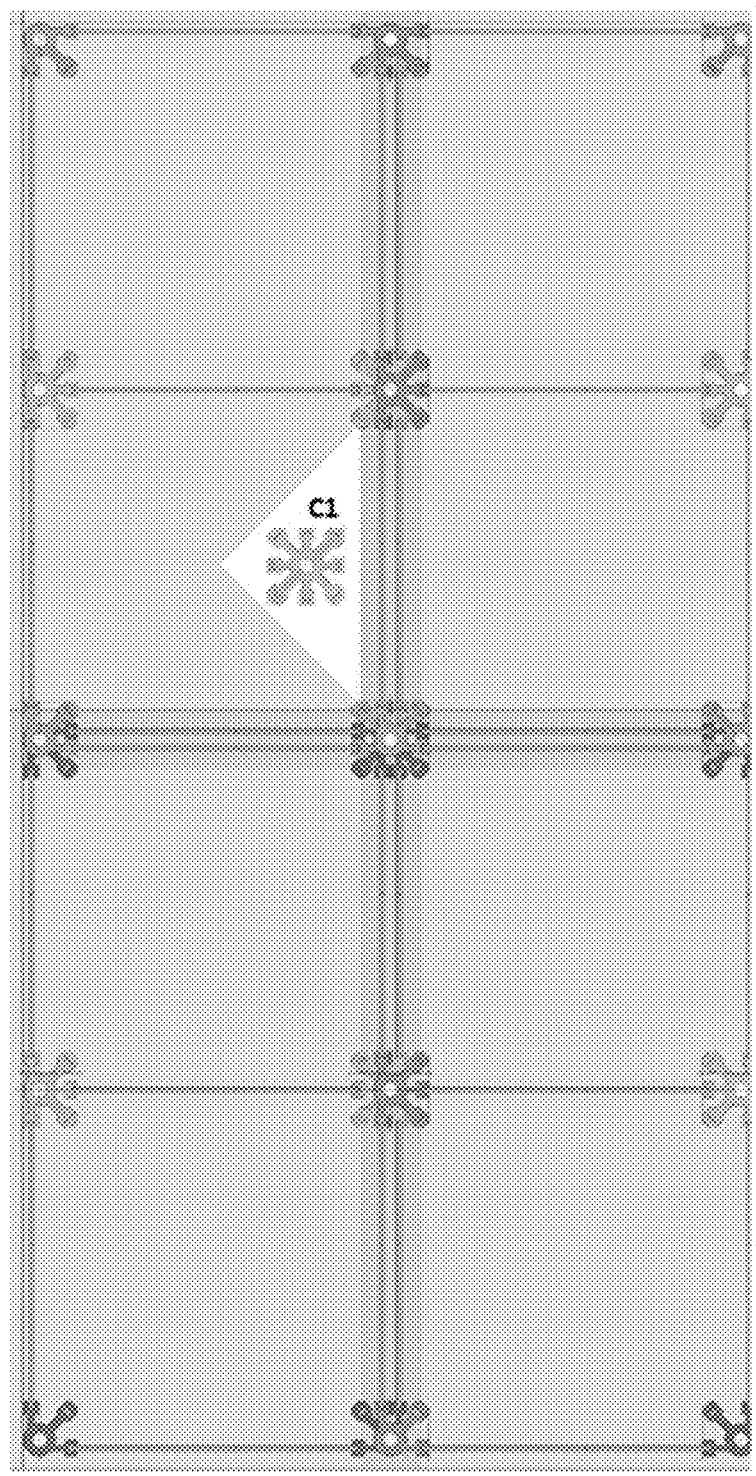

FIG. 14 shows the overlapping of four panel systems with their respective meshes and frames formed by the flat connectors and their flat tension wires already connected. In the case of a whole panel system with no overlap at that central point where eight lines of panel system strapping converge, close-up C1 shows the flat connector plate (15) that will replace the central node at that point with the set of flat plates of four panel systems.

Figure 15:
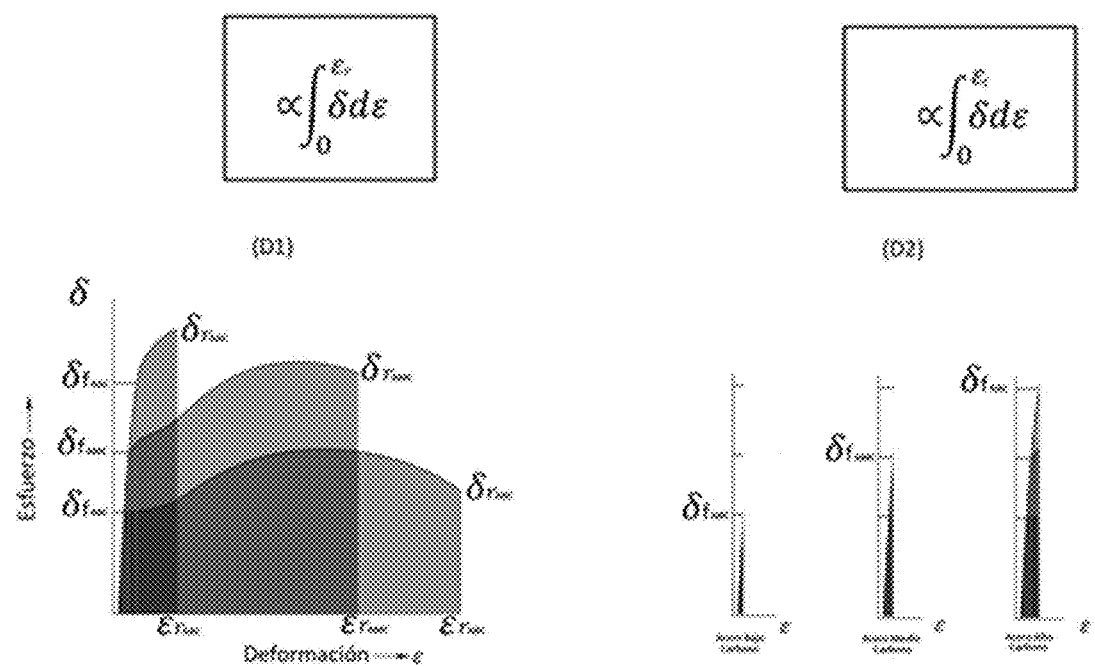

FIG. 15 shows a graph with a qualitative representation of the Stress/Strain curves of low, medium and high strength steels (low, medium and high carbon). Low strength steels creep first until reaching Creep Sigma $\delta fABC$, but these in turn reach a large permanent plastic deformation $\varepsilon rABC$ and break with a Breakage Sigma $\delta rABC$ just above $\delta fABC$. At the other end, high-strength steels creep at $\delta fAAC$ times the value of low-carbon steels, but in turn exhibit high strain hardening, reaching a high Sigma of Rupture $\delta rAAC$ and present the difficulty of breaking abruptly with very little deformation $\varepsilon rAAC$. The properties of medium-strength steels are in between these two extremes. This steel behavior according to their strength is directly related to the energy required to cause them to rupture, giving rise to an apparent paradox: Higher strength steels absorb little strain energy, represented by the area under the $\int \delta d\varepsilon$ curve, integrated between the values 0 and $\delta rAAC$, compared to the curve of low-strength steels $\int \delta d\varepsilon$, between the values of 0 and $\delta rABC$. Similarly, medium-strength steels exhibit energy absorption between high and low strength values. The optimum steel to form the steel strip/strap mesh will be one that is strong enough to contain the mass released and ductile enough to absorb the kinetic energy of the rockburst. It will therefore be somewhere between a high-strength and a low-strength steel. The selection of the optimum steel can be obtained from a simple engineering calculation.

Figure 16:
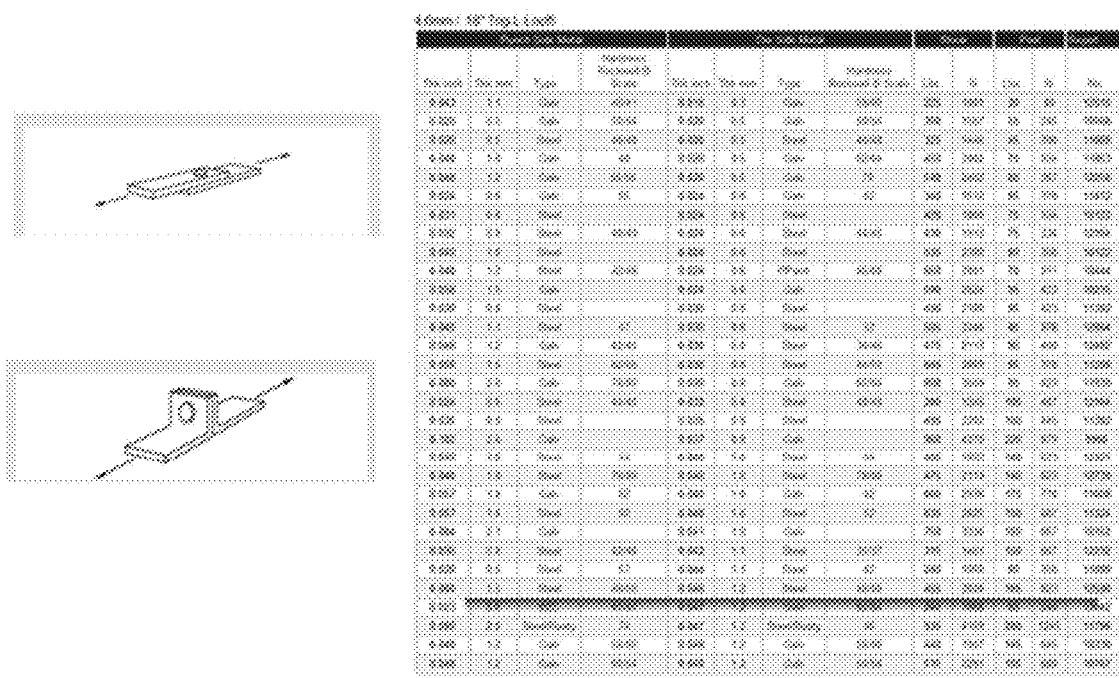

FIG. 16 shows a graph where the upper figure shows two metal strips joined by overlapping and self-riveting with a hydraulic tool. This joint presents the shear stresses for different combinations of thicknesses shown in the table on the left. Similarly, the figure below represents the L-shaped end joint with the same type of self-riveting. The value of the force to tear off one strip from the other is provided for the same combination of steel strips and for the same size of the aforementioned self-riveting. With these values provided by the manufacturer of the self-riveting presses, it may be established that this joint is not sufficient for the strips to withstand the punching test used to determine the strength of a mining mesh, since no matter the size of each strip section, it cannot have a combination of thicknesses providing the required strength, as this joint is determined by the rivet and not by the strength of the strip. This information demonstrates that the aforementioned mesh made of self-riveted strips cannot be used to contain or absorb rockburst energy.

APPLICATION EXAMPLE

FIGS. 17 and 18 show the result of a comparative strength analysis between a braided mesh (Inchalam MFI3500-100) and a mesh of the panel system of the present invention. The analysis was performed with finite elements on the SAMCEF platform, indicating the result of two different tests, a static punching test and a flat plate load test. Both tests are widely used to describe mesh performance.

The conditions for these tests were as follows:

Inchalam Braided Mesh

For the braided mesh, a section of one square meter of braided mesh was used, the braiding considered a twist between wires forming rhomboid type meshes where the four vertices are formed by different wires without linear structural continuity. Regardless of how the mesh is formed, each node that is formed has translational freedom.

On the other hand, all free nodes at the ends of the mesh were secured by crushing the edges onto a frame.

Mesh Panel System of the Present Development

For the panel system, a one-meter square section with 19 mm wide×0.79 mm thick strapping was used in an overlapping layout of the straps as shown in FIG. 1. This overlapping forms squares between 4 different straps, but with linear structural continuity. Regardless of how the straps are formed, each node that is formed is not free to move because it is constructed as if it were fixed by welding with three diagonal points as shown in FIG. 5C.

A pyramidal punch with a square base and a side of 15 cm and a length of its vertices of 12 cm was used for the static punching test. The punch is pressed on the wire mesh and on the mesh of the panel system by matching it in the space left between 4 nodes. (see FIG. 17)

For the static test of a flat metal plate (simulating a plate), a flat plate of 30×30×3.5 cm with rounded edges on the lower face was used. The plate is pressed onto 13 nodes in the braided mesh layout and 16 nodes in the panel system. (See FIG. 18).

The results of the punching test indicate that the braided mesh withstands a maximum force before rupture of 842 kg (8250 N), with a maximum displacement of 98 mm. On the other hand, the mesh of the panel system withstands a maximum pre-shear force of 1796 kg (17604 N), with a maximum displacement of 79 mm.

The analysis then concludes that, compared to braided meshes disclosed in the state of the art, the present invention of the panel system manages to withstand 2.1 times more force than the Inchalam mesh in the punching test.

The results of the flat plate test indicate that the braided mesh withstands a maximum force before rupture of 2146 kg (21028 N). On the other hand, the mesh of the panel system resists a force before rupture of 4114 kg (40318 N).

The analysis then concludes that, compared to braided meshes disclosed in the state of the art, this panel system development manages to withstand 1.9 times more force than the mesh in a flat plate test.

Figure 19:
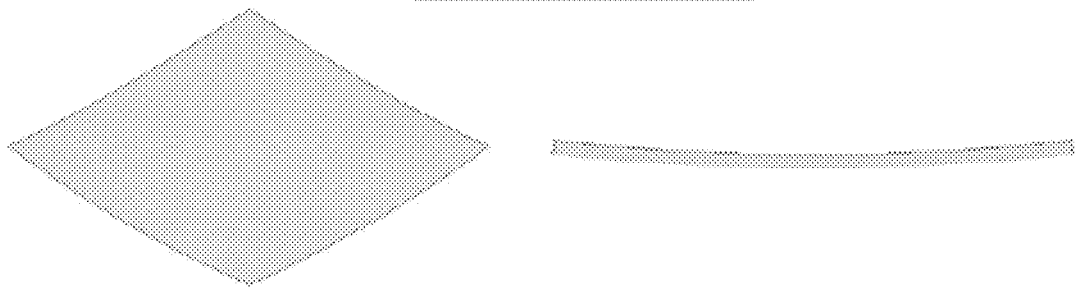
Figure 19:
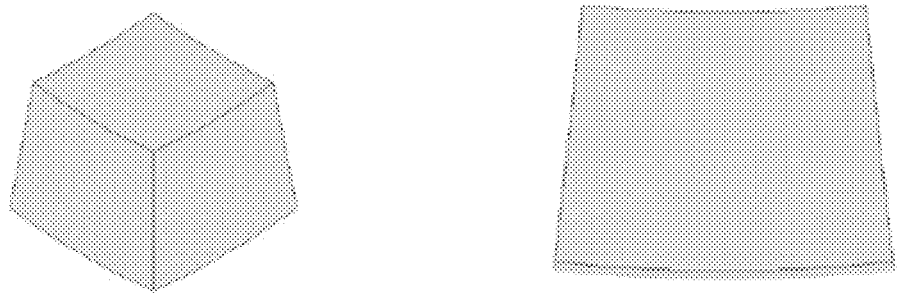

FIG. 19 schematically depicts the impact test trial with a rigid plate and with a flexible volume for the braided mesh models and for the panel system of this invention.

Figure 20:
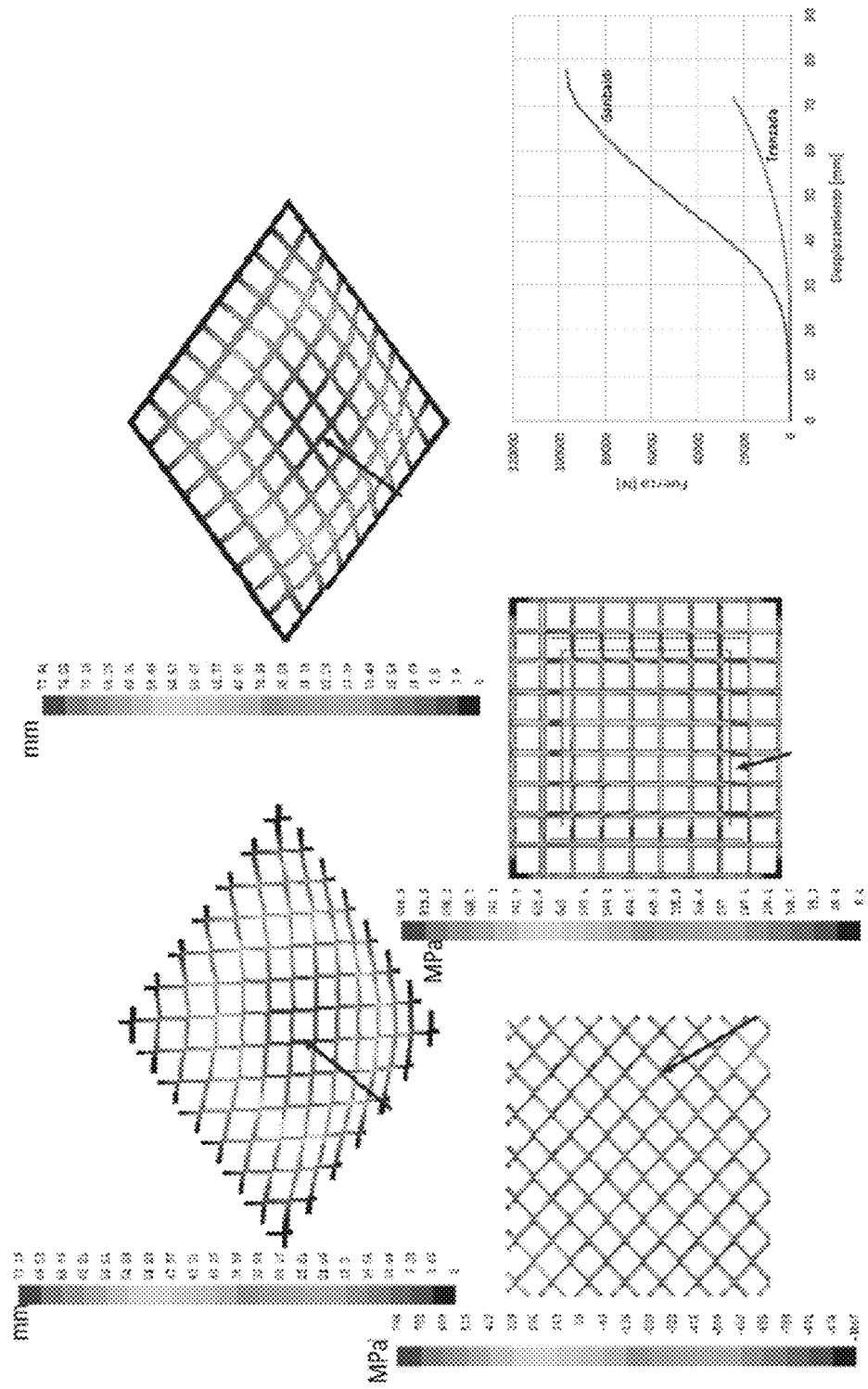
Figure 21:
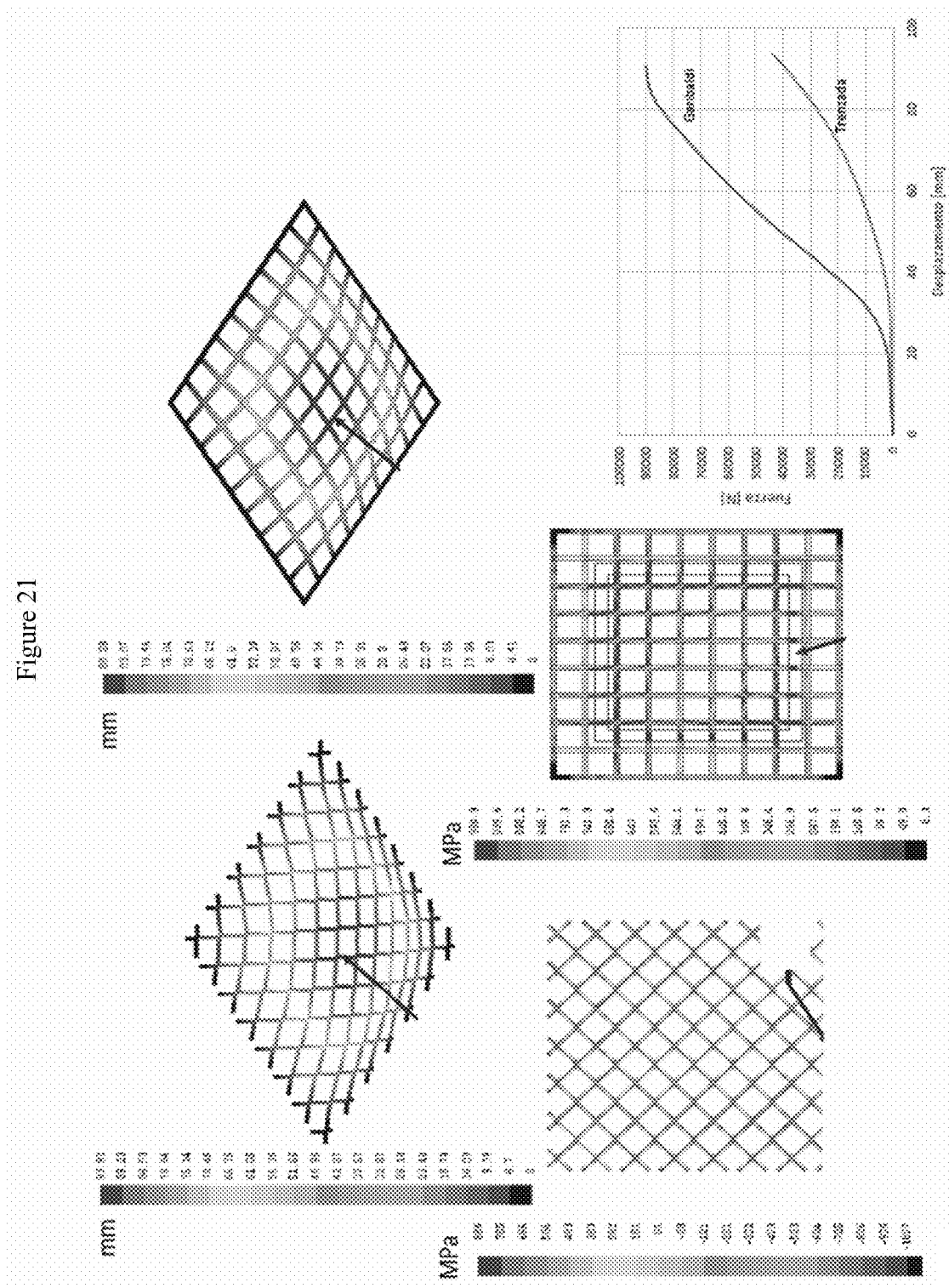

FIGS. 20 and 21 show the result of a comparative strength analysis between a braided mesh (Inchalam MFI3500-100) and a mesh of the panel system of this invention, with the same characteristics as described in the foregoing paragraphs. The analysis was performed with two different tests, a rigid plate impact test and a flexible volume impact test. Both tests are widely used to describe mesh and panel performance.

For the rigid plate impact test, we used a mass corresponding to a pyramid-shaped bag with steel balls inside.

The size of the base is 650×650 mm, and it was given a curvature equivalent to a sphere with a radius of 3000 mm.

The mass was developed in two ways:

Fully Rigid Plate

Flexible volume plate with a stiffness equivalent to that of the rubber (=7)

Contact conditions were applied between the mass and the mesh, where the top of the mass was rigidly attached to a node on which vertical forces were gradually applied.

FIG. 20 shows, at the top, a comparative deformation diagram (measured in mm) or displacement modulus at rupture, by the impact of a rigid plate on a braided mesh (upper left) and the Panel system of this invention (upper right), where it can be seen that the braided mesh deforms up to 73 mm before rupture and the Panel system of this invention deforms up to 78 mm before rupture. The lower part of the same figure shows the analysis of the equivalent stress at rupture (MPa), where it can be clearly seen that the braided mesh resists a stress equivalent to 795 MPa, unlike the Panel system of this invention, which resists a maximum of 989 MPa.

Finally, a curve relating force (N) to displacement (mm) and absorbed energy (KJ) is shown. The following table shows a comparative study with the rigid plate test: (Note: Hereinafter, when "Garibaldi" is mentioned in tables, it refers to a metal strip panel of this invention).

| Malla | Desplazamiento [mm] | Fuerza [N] | Energía [kJ] |
|---|---|---|---|
| Trenzada | 73.2 | 24900.0 | 0.41 |
| Garibaldi | 77.9 | 96843.9 | 2.86 |

FIG. 21 shows, at the top, a comparative deformation diagram (measured in mm) or displacement modulus at rupture, by the impact of a flexible volume on a braided mesh (upper left) and the Panel system of this invention (upper right), where it can be seen that the braided mesh deforms up to 94 mm before rupture and the Panel system of this invention deforms up to 88 mm before rupture. The lower part of the same figure shows the analysis of the equivalent stress at rupture (MPa), where it can be clearly seen that the braided mesh resists a stress equivalent to 886 MPa, unlike the Panel system of this invention, which resists a maximum of 989 MPa.

Finally, a curve relating force (N) to displacement (mm) and absorbed energy (KJ) is shown. The following table shows a comparative study of the test with a flexible volume:

| Malla | Desplazamiento [mm] | Fuerza [N] | Energía [kJ] |
|---|---|---|---|
| Trenzada | 93.9 | 43709.3 | 1.0 |
| Garibaldi | 88.3 | 90174.1 | 3.4 |

Figure 22:
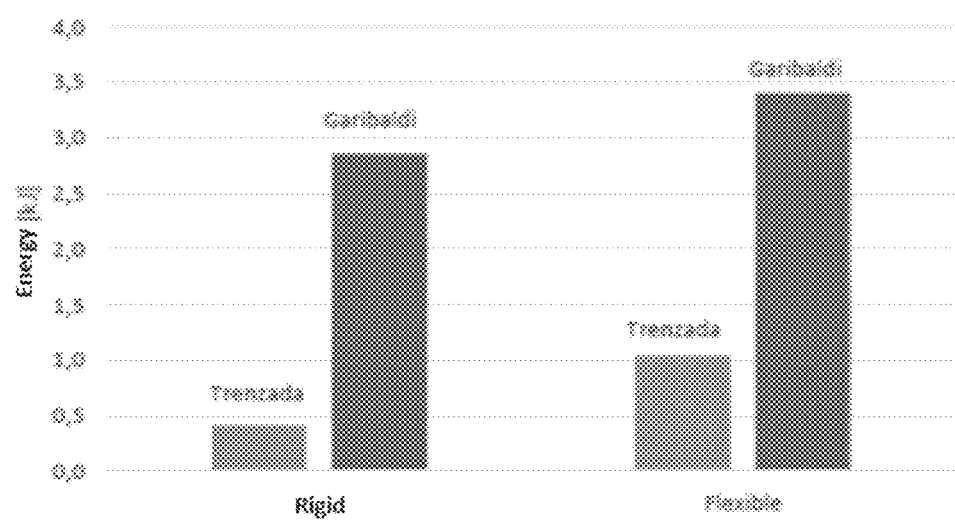

Based on the above tests, the panel system is capable of absorbing more than twice the energy than a braided mesh in impact tests. This can be clearly observed in the diagram in FIG. 22 and in its explanatory table:

| Malla | Caso | Desplazamiento [mm] | Fuerza [N] | Energía [kJ] |
|---|---|---|---|---|
| Trenzada | Rigido | 73.2 | −24900.0 | 0.4 |
| | Flexible | 93.9 | −43709.3 | 1.0 |
| Garibaldi | Rigido | 77.9 | −96843.9 | 2.9 |
| | Flexible | 88.3 | −90174.1 | 3.4 |

The invention claimed is:

1. A panel system to contain landslides due to partial collapse and "rockbursts" for use as reinforcement structures in mine tunnels, slopes and roads together with anchor bolts and plates, the panel system comprising:
   a mesh made of metal straps or other tensile or tear resistant material along the length of the strap, wherein each node of the mesh where straps cross is firmly attached with a buckle; and
   a frame secured to said mesh, wherein the frame includes flat tension wires near the perimeter of the panel, the wires attached to flat plates with ear flaps or with flat connectors adapted to be placed underneath the plates, wherein the buckle comprises a plate having two pairs of bendable tabs on each of the opposed sides, wherein the buckle is configured to be placed between the strap surfaces where the two straps meet, one strap perpendicular to the other, a first pair of tabs for wrapping the two edges of one strap in one direction and the second pair of tabs for wrapping the edges of the other strap in the opposite direction, and wherein the four tabs are flattened to trap both perpendicular straps for securing the node, and wherein the node is secured due to friction between the buckle and the node can preserve all the capacity for creep resistance, maximum resistance, and elongation of the straps forming the mesh.

2. A panel system, according to claim 1, wherein the buckle has an upper surface and a lower surface, each surface having a die-cut tab perpendicular to the other, wherein each tab is inserted into a longitudinal cut on one side of a strap, wherein the die-cut tabs are flattened with the pairs of tabs for securing the mesh node, and wherein the buckle results in a fixed node with resistance to being displaced provided by the die-cut tab in a strap groove.

3. A panel system, according to claim 1, wherein each of the two straps has parallel longitudinal grooves, and wherein the pairs of tabs wraps around the inner edges of the straps and seat in the grooves, and wherein the buckle squeezes the edges by flattening the 4 tabs on both sides, but remains locked in position due to the shear effect of all the tabs acting against the ends of the grooves giving this node a higher slip resistance.

4. A panel system, according to claim 3, wherein the grooves avoid the propagation of a diagonal cracks at the point where the edge of the tabs of the buckle meets the grooves.

5. A panel system, according to claim 1, wherein the straps are connected perpendicularly, at each node of the mesh, at three points aligned on a diagonal, by means of equidistant welds within and centered in the area where the two straps touch one another.

6. A panel system according to claim 1, wherein the straps are connected perpendicularly, at each node of the mesh at a pre-drilled central point, in which a rivet is inserted, in the center of the area where the two strips meet.

7. A panel system, according to claim 1, wherein the frame comprises flat tension wires made of high strength straps, which overlap the mesh and which are joined at every point where they touch the mesh by means of clamps which tie both sides of the straps to the flat tension wires at all the nodes of the mesh underlying the tension wires, and further comprising plates with U-shaped ear flaps for joining at the meeting point between the frame and the anchor bolts by means of a solid cylindrical pin that goes over the ear flap and inside a closed loop of the tension wire ends, which pass through ear flaps and are welded to the upper surface of the plates.

8. A panel system according to claim 7, wherein the flat tension wires are formed by high strength straps, and "U" shaped hooks are welded to the plates in four places at perpendicular angles centered on a central perforation adapted to receive the anchor bolt, wherein the flat tension wires pass through a hook of the plate and are fastened on pins that prevent them from slipping out of this junction.

9. A panel system according to claim 7, wherein the frame and the flat tension wires are also part of a mesh panel adapted so that on-site the anchor bolts are placed in positions that allow for these panels to be placed side by side and the frame wraps around all the panels placed so that they behave as a single large panel, and further comprising flat connectors placed in the corners and a buckle including arms protruding from these flat connectors each of these arms having a groove whose edge will support a strap, and having a partial die-cut a little wider than the straps that will join these flat connectors.

10. A panel system, according to claim 9, further comprising an open buckle with two tabs on the sides for wrapping around the set of straps forming a tension wire and the two tabs trapping the tip of the strap that loops in this buckle.

11. A panel system, according to claim 9, wherein each of the flat tension wires of the frame are formed of a single long strap joining two arms of the flat connectors with two or more loops, wherein a strength proportional to the number of loops is obtained, and wherein the ends and fastenings of the ends of this strap are formed by mechanical embossing of the end with the same strap, wherein the resistance of the strap joint at these points must be equal to the resistance of the strap section such that the tension wire resistance will therefore be the sum of the individual resistances of each strap section.

12. A panel system, according to claim 7, wherein the panel is manufactured entirely off-site with the hooked plates and tension wires in advance, and then installed in the tunnel, only if the location of the anchor bolts and the tunnel geometry are known in advance, or it can be manufactured on site and adapted to the tunnel geometry.

13. A panel system, according to claim 7, further comprising two clamps with pins, wherein the junctions of each metal strap of the mesh lie below the flat tension wires of the frame and are attached to the frame around its entire edge with the two clamps with pins which wrap around the flat tension wires and the strap for integrating the mesh structurally to the frame at all points.

* * * * *